US012698880B2

(12) United States Patent
Lim et al.

(10) Patent No.: US 12,698,880 B2
(45) Date of Patent: Aug. 4, 2026

(54) LIGHTING MODULE, LIGHTING DEVICE AND TAILLIGHT

(71) Applicant: LG INNOTEK CO., LTD., Seoul (KR)

(72) Inventors: Eay Jin Lim, Seoul (KR); Gyeong Il Jin, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 19/181,842

(22) Filed: Apr. 17, 2025

(65) Prior Publication Data

US 2026/0160399 A1 Jun. 11, 2026

Related U.S. Application Data

(63) Continuation of application No. 18/629,187, filed on Apr. 8, 2024, now Pat. No. 12,352,404, which is a (Continued)

(30) Foreign Application Priority Data

May 20, 2020 (KR) ........................ 10-2020-0060350

(51) Int. Cl.
*F21S 43/242* (2018.01)
*F21S 43/14* (2018.01)
*F21S 43/31* (2018.01)

(52) U.S. Cl.
CPC ............. *F21S 43/242* (2018.01); *F21S 43/14* (2018.01); *F21S 43/31* (2018.01)

(58) Field of Classification Search
CPC ................ G02B 6/0038; G02B 6/0036; G02F 1/133605; G02F 1/133606; G02F 1/133607
See application file for complete search history.

(56) References Cited

U.S. PATENT DOCUMENTS 7,753,579 B2 7/2010 Kim
8,556,444 B2 10/2013 Kim et al.
(Continued)

FOREIGN PATENT DOCUMENTS

CN 1800942 3/1993
CN 102483542 5/2012
(Continued)

OTHER PUBLICATIONS

International Search Report dated Sep. 1, 2021 issued in Application No. PCT/KR2021/006026.
(Continued)

*Primary Examiner* — Eric T Eide
(74) *Attorney, Agent, or Firm* — KED & ASSOCIATES, LLP

(57) ABSTRACT

A lighting device disclosed in an embodiment of the invention includes a substrate; a reflective member disposed on the substrate; a plurality of light emitting devices disposed on the substrate; a resin layer disposed on the reflective member; and an optical pattern portion having a plurality of concave portions concavely formed on an upper surface of the resin layer, wherein the plurality of light emitting devices is spaced apart in a first direction in which light is emitted, wherein the optical pattern portion includes a pattern portion in which a width of the concave portions is reduced from a position overlapping a center of each of the plurality of light emitting devices in the first direction, wherein the optical pattern portion includes a pattern portion in which a width of the concave portions is reduced from the center of the optical pattern portion toward both sides of a second direction.

20 Claims, 16 Drawing Sheets

Related U.S. Application Data continuation of application No. 17/925,626, filed as application No. PCT/KR2021/006026 on May 13, 2021, now Pat. No. 11,976,801.

(56) References Cited

U.S. PATENT DOCUMENTS

| | | | | |
|---|---|---|---|---|
| 9,658,383 | B2 | 5/2017 | Chen et al. | |
| 9,904,105 | B2 | 2/2018 | Ma et al. | |
| 10,753,546 | B2 | 8/2020 | Hwang et al. | |
| 10,871,607 | B2 | 12/2020 | Yasunaga et al. | |
| 11,125,396 | B2 | 9/2021 | Hwang et al. | |
| 2006/0083020 | A1 | 4/2006 | Tai et al. | |
| 2006/0087867 | A1 | 4/2006 | Kim | |
| 2011/0050735 | A1 | 3/2011 | Bae et al. | |
| 2011/0051411 | A1 | 3/2011 | Kim et al. | |
| 2011/0261286 | A1 | 10/2011 | Choi et al. | |
| 2015/0212252 | A1 | 7/2015 | Sakamoto | |
| 2015/0285984 | A1 | 10/2015 | Chen et al. | |
| 2017/0205556 | A1 | 7/2017 | Chen et al. | |
| 2018/0210129 | A1 | 7/2018 | Uno et al. | |
| 2019/0137046 | A1 | 5/2019 | Hwang et al. | |
| 2020/0332966 | A1 | 10/2020 | Hwang et al. | |
| 2023/0135095 | A1* | 5/2023 | Choi | F21K 9/69 362/459 |

FOREIGN PATENT DOCUMENTS

| | | |
|---|---|---|
| EP | 3453939 | 3/2019 |
| JP | 2013-503431 | 1/2013 |
| JP | 3197846 | 6/2015 |
| JP | 6603723 | 11/2019 |
| KR | 10-2011-0060473 | 6/2011 |
| KR | 10-2014-0059448 | 5/2014 |
| KR | 10-2017-0125657 | 11/2017 |

OTHER PUBLICATIONS

U.S. Office Action dated Sep. 13, 2023 issued in parent U.S. Appl. No. 17/925,626.

Extended European Search Report dated May 8, 2024 issued in Application No. 21808516.5.

Japanese Office Action dated Dec. 3, 2024, issued in Application No. 2022-570183.

U.S. Office Action dated Jan. 24, 2025, issued in U.S. Appl. No. 18/629,187.

Chinese Office Action dated Mar. 5, 2026, issued in Application No. 202180036554.5.

* cited by examiner (a) Example 1

(b) Example 2

(c) Example 3

(d) Comparative example

LIGHTING MODULE, LIGHTING DEVICE AND TAILLIGHT

CROSS-REFERENCE TO RELATED APPLICATIONS

This application is a Continuation Application of U.S. patent application Ser. No. 18/629,187 filed Apr. 8, 2024, which is a Continuation Application of U.S. patent application Ser. No. 17/925,626 filed Nov. 16, 2022, now U.S. Pat. No. 11,976,801, issued on May 7, 2024, which is a U.S. National Stage Application under 35 U.S.C. § 371 of PCT Application No. PCT/KR2021/006026, filed May 13, 2021, which claims priority to Korean Patent Application No. 10-2020-0060350, filed May 20, 2020, whose entire disclosures are hereby incorporated by reference.

BACKGROUND

1. Field

An embodiment of the invention relates to a lighting module having a plurality of light sources, a lighting device and a tail lamp.

2. Background

Lighting applications include vehicle lights as well as backlights for displays and signage. A light emitting device, for example, a light emitting diode (LED), has advantages such as low power consumption, semi-permanent life, fast response speed, safety, and environmental friendliness compared to conventional light sources such as fluorescent lamps and incandescent lamps. These light emitting diodes are applied to various display devices, various lighting devices such as indoor or outdoor lights. Recently, as a vehicle light source, a lamp employing a light emitting diode has been proposed. Compared with incandescent lamps, light emitting diodes are advantageous in that power consumption is small. However, since a directivity angle of light emitted from the light emitting diode is small, when the light emitting diode is used as a vehicle lamp, there is a demand for increasing the light emitting area of the lamp using the light emitting diode.

BRIEF DESCRIPTION OF THE DRAWINGS

The embodiments will be described in detail with reference to the following drawings in which like reference numerals refer to like elements wherein.

DETAILED DESCRIPTION

Figure 1:
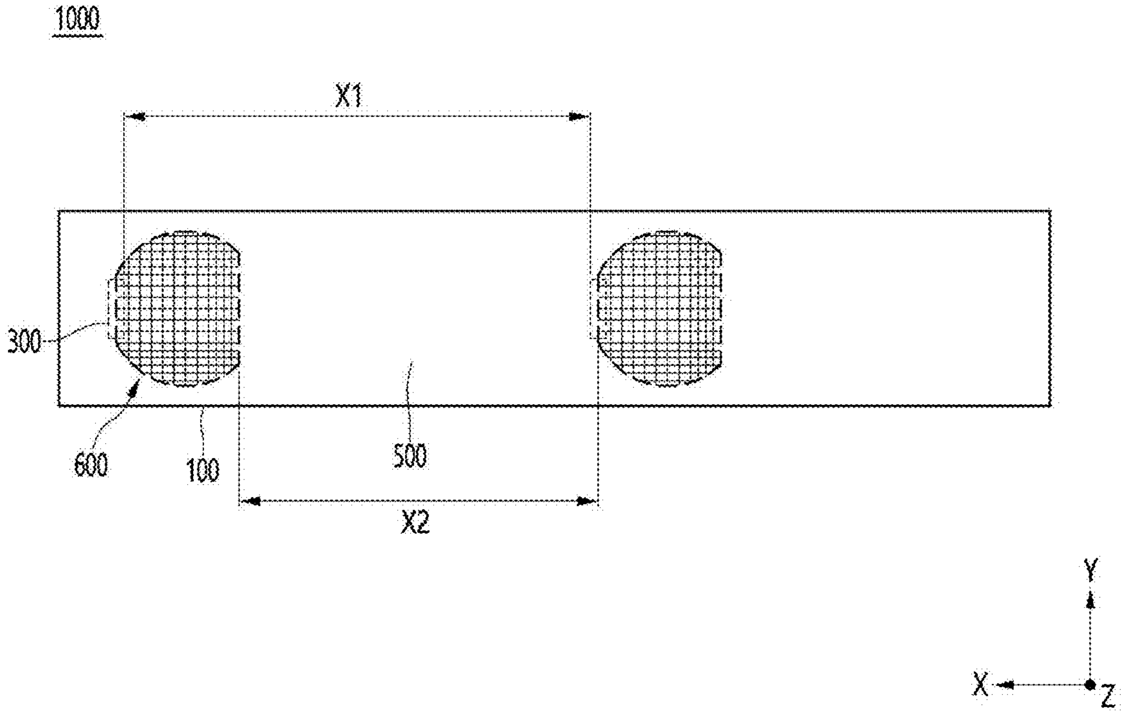
FIG. 1 is an example of a plan view of a lighting device according to an embodiment of the invention.

Hereinafter, preferred embodiments of the invention will be described in detail with reference to the accompanying drawings.

The technical spirit of the invention is not limited to some embodiments to be described, and may be implemented in various other forms, and one or more of the components may be selectively combined and substituted for use within the scope of the technical spirit of the invention. In addition, the terms (including technical and scientific terms) used in the embodiments of the invention, unless specifically defined and described explicitly, may be interpreted in a meaning that may be generally understood by those having ordinary skill in the art to which the invention pertains, and terms that are commonly used such as terms defined in a dictionary should be able to interpret their meanings in consideration of the contextual meaning of the relevant technology. Further, the terms used in the embodiments of the invention are for explaining the embodiments and are not intended to limit the invention. In this specification, the singular forms also may include plural forms unless otherwise specifically stated in a phrase, and in the case in which at least one (or one or more) of A and (and) B, C is stated, it may include one or more of all combinations that may be combined with A, B, and C. In describing the components of the embodiments of the invention, terms such as first, second, A, B, (a), and (b) may be used. Such terms are only for distinguishing the component from other component, and may not be determined by the term by the nature, sequence or procedure etc. of the corresponding constituent element. And when it is described that a component is "connected", "coupled" or "joined" to another component, the description may include not only being directly connected, coupled or joined to the other component but also being "connected", "coupled" or "joined" by another component between the component and the other component. In addition, in the case of being described as being formed or disposed "above (on)" or "below (under)" of each component, the description includes not only when two components are in direct contact with each other, but also when one or more other components are formed or disposed between the two components. In addition, when expressed as "above (on)" or "below (under)", it may refer to a downward direction as well as an upward direction with respect to one element.

The lighting device according to the invention may be applied to various lamp devices that require lighting, such as vehicle lamps, home lighting devices, or industrial lighting devices. For example, when applied to vehicle lamps, it is applicable to headlamps, sidelights, side mirrors, fog lights, tail lamps, brake lights, daytime running lights, vehicle interior lights, door scars, rear combination lamps, backup lamps, etc. The lighting device of the invention may be applied to indoor and outdoor advertising devices, display devices, and various electric vehicle fields, and in addition, it may be applied to all lighting-related fields or advertisement-related fields that are currently developed and commercialized or that may be implemented according to future technological developments.

Figure 2:
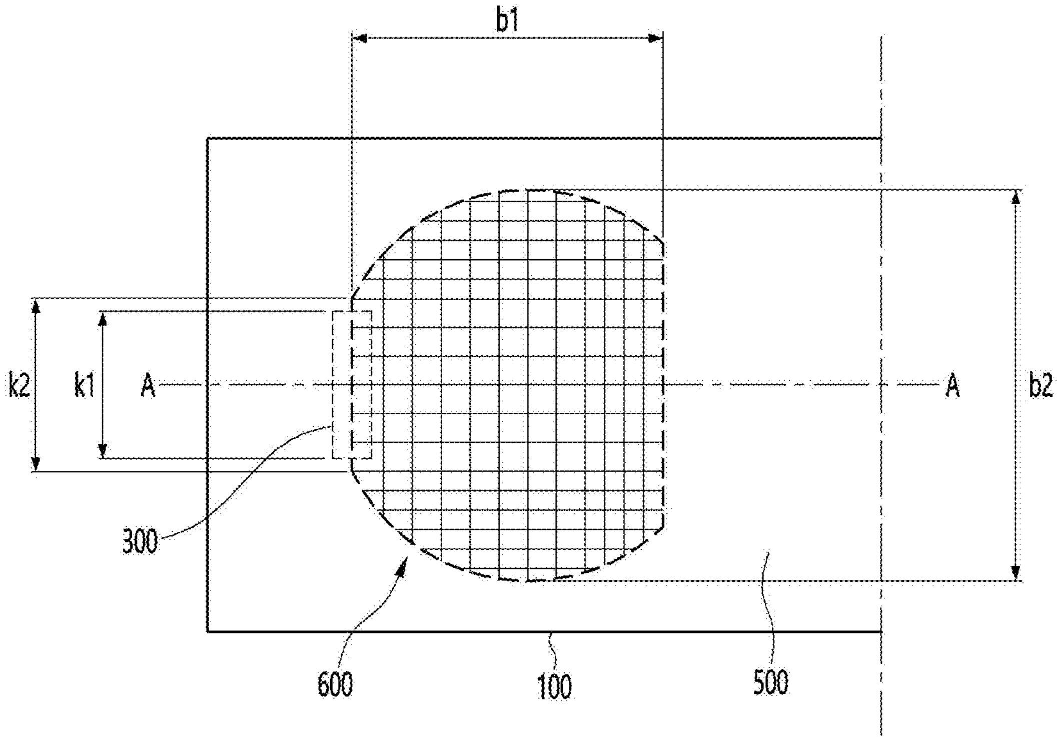
FIG. 2 is a partially enlarged view of the resin layer of FIG. 1.
Figure 3:
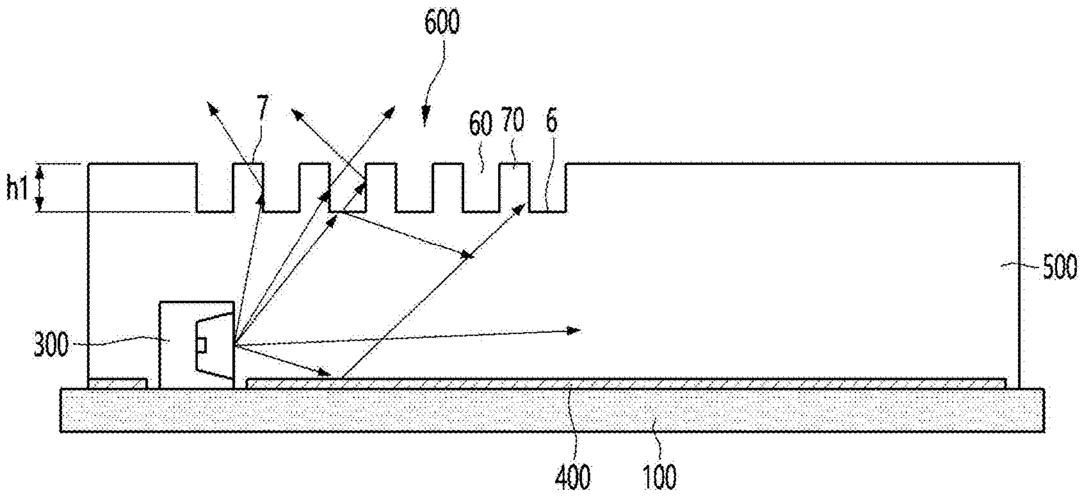
FIG. 3 is a view illustrating an example of a concave portion of an optical pattern portion according to an embodiment of the invention.
Figure 4:
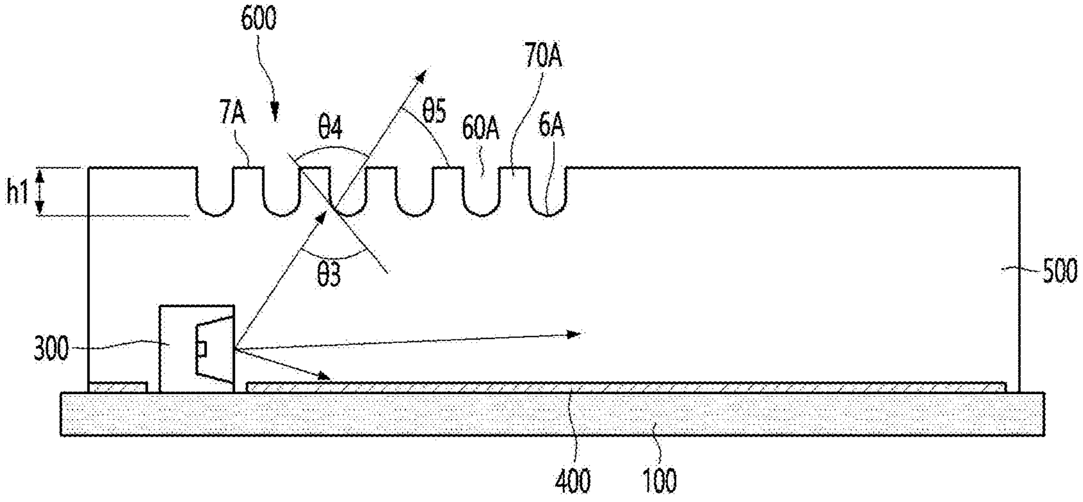
FIG. 4 is a view showing a modified example of the concave portion of the optical pattern portion according to an embodiment of the invention.
Figure 5:
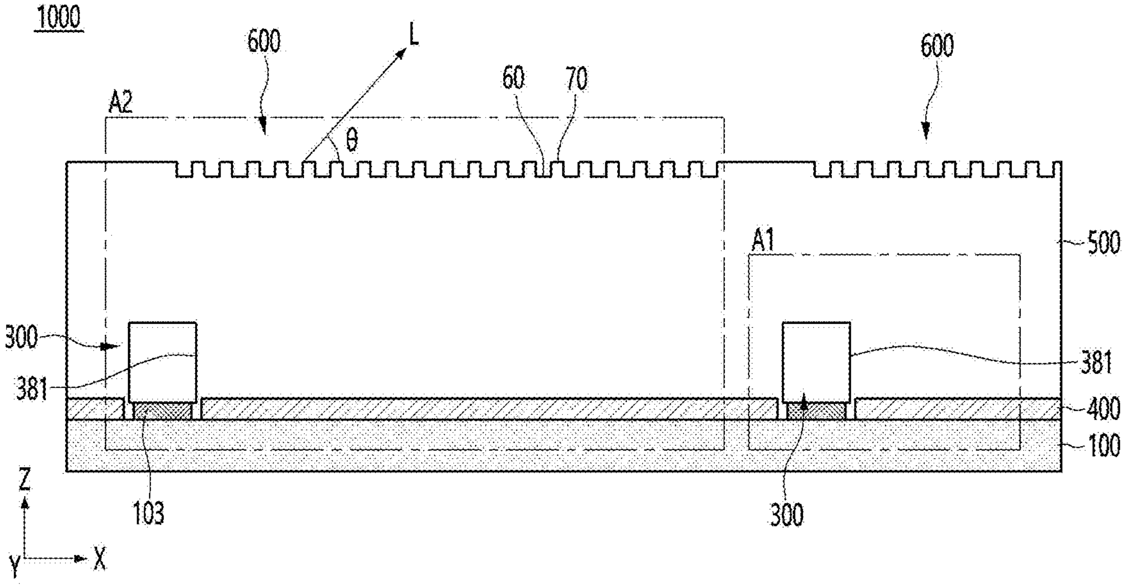
FIG. 5 is an example of a side cross-sectional view of the lighting device of FIG. 1 in a first direction.
Figure 6:
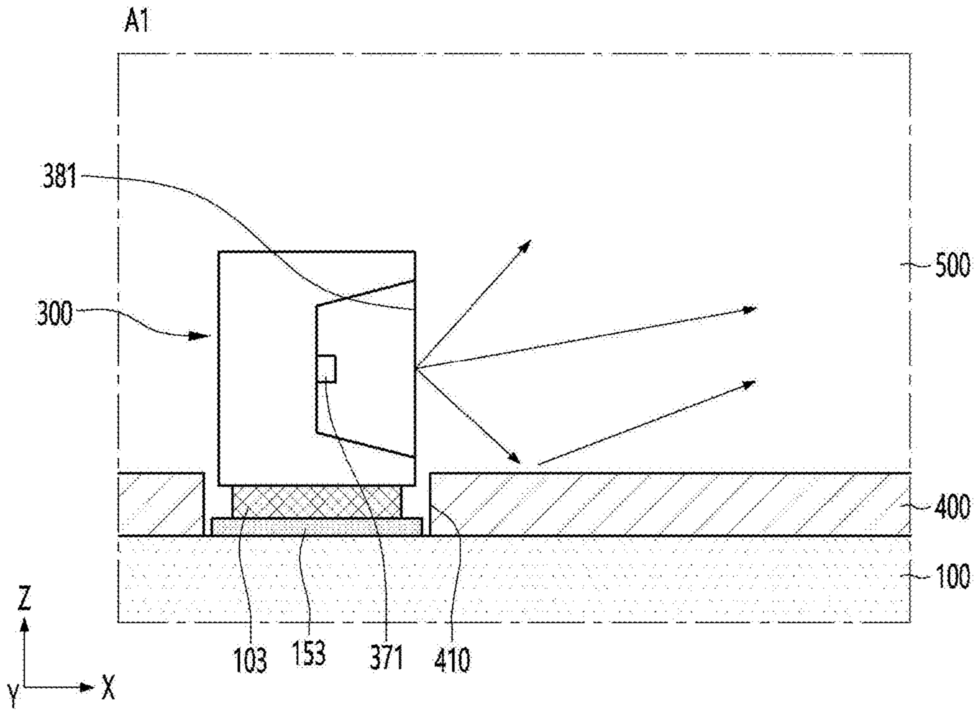
FIG. 6 is an enlarged view of region A1 of FIG. 5.
Figure 7:
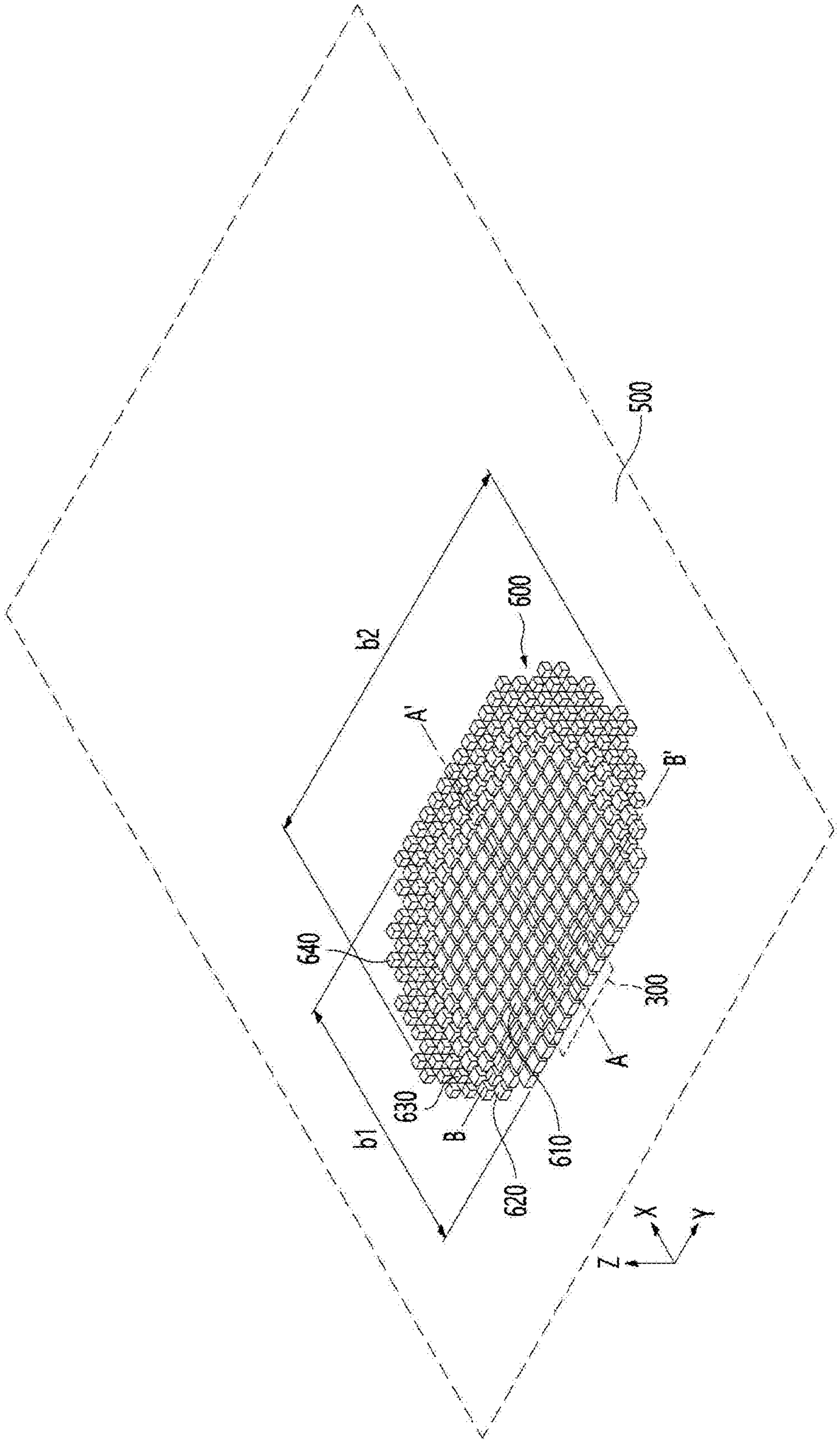
FIG. 7 is a first example of the optical pattern portion of the invention, and is a plan view of the region A2 of FIGS. 2 and 5.
Figure 8:
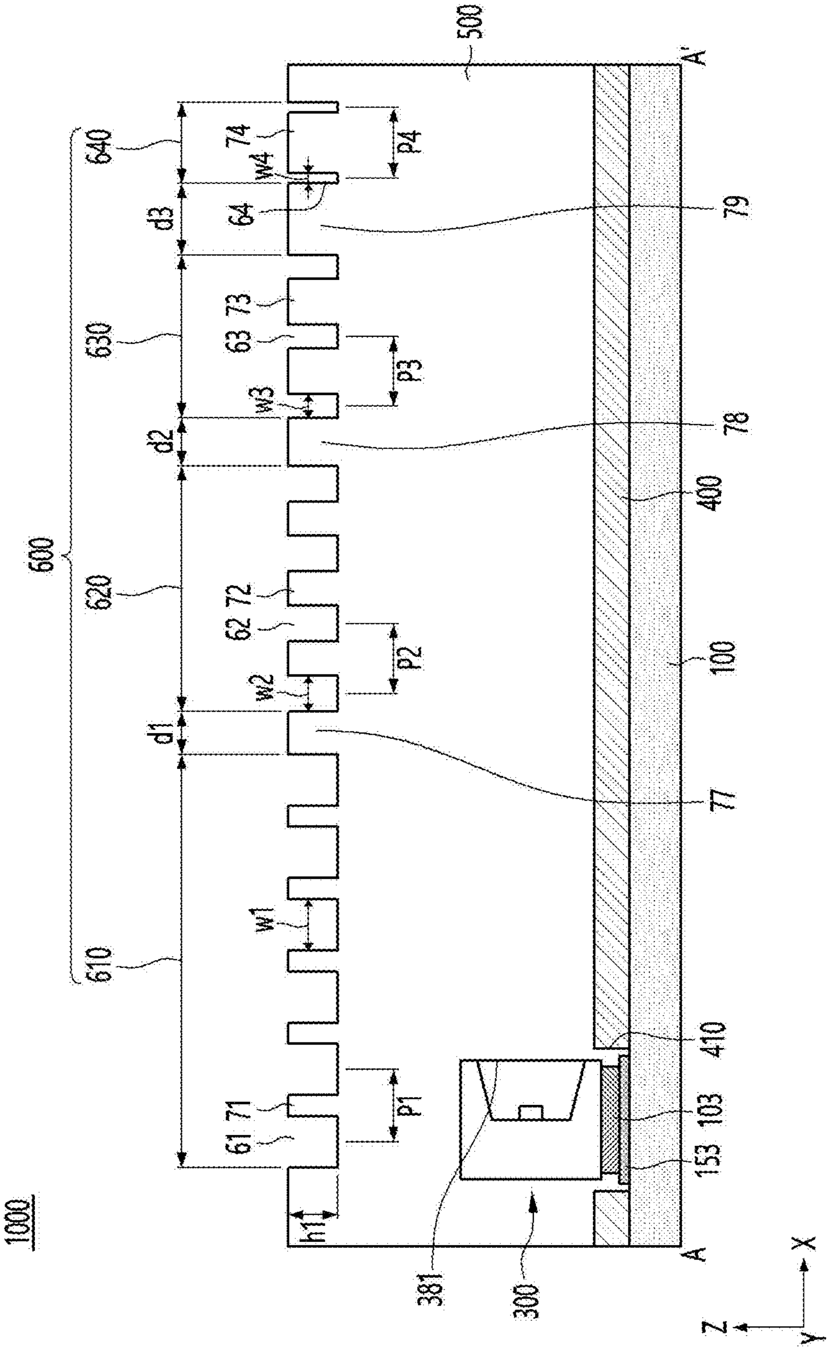
FIG. 8 is a cross-sectional side view taken along line A-A' of FIG. 7 as region A2 of FIG. 5.
Figure 9:
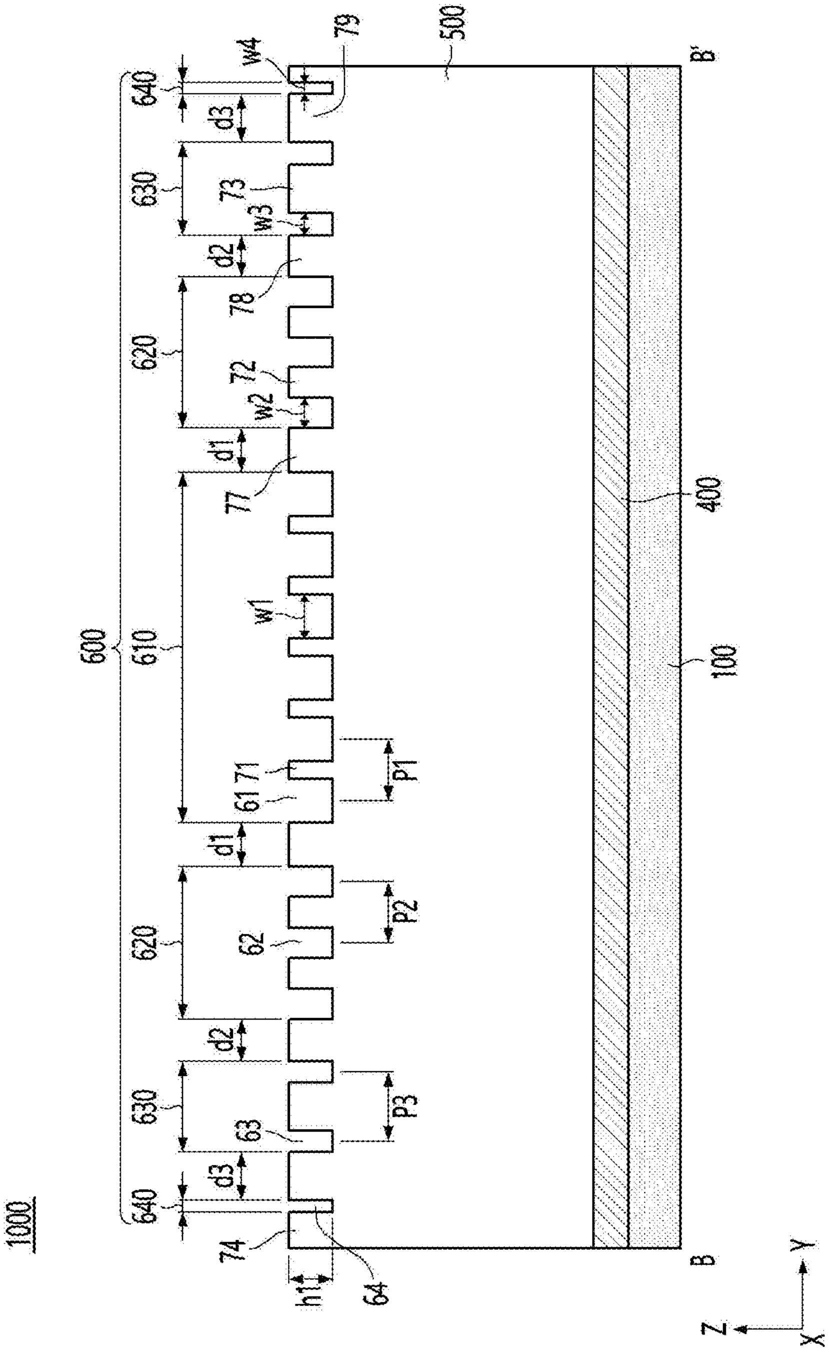
FIG. 9 is an example of a cross-sectional side view taken along line B-B' of FIG. 7.

FIG. 1 is an example of a plan view of a lighting device according to an embodiment of the invention, FIG. 2 is a partially enlarged view of the resin layer of FIG. 1, FIG. 3 is a view illustrating an example of a concave portion of an optical pattern portion according to an embodiment of the invention, FIG. 4 is a view showing a modified example of the concave portion of the optical pattern portion according to an embodiment of the invention, FIG. 5 is an example of a side cross-sectional view of the lighting device of FIG. 1 in a first direction, FIG. 6 is an enlarged view of region A1 of FIG. 5, FIG. 7 is a first example of the optical pattern portion of the invention, and is a plan view of the region A2 of FIGS. 2 and 5, FIG. 8 is a cross-sectional side view taken along line A-A' of FIG. 7 as region A2 of FIG. 5, and FIG. 9 is an example of a cross-sectional side view taken along line B-B' of FIG. 7.

Referring to FIGS. 1 to 6, a lighting device 1000 according to an embodiment of the invention may include a light emitting device 300 and a resin layer 500 sealing the light emitting device 300 and having an optical pattern portion 600. The lighting device 1000 may include the light emitting device 300 and the substrate 100 disposed under the resin layer 500. The lighting device 1000 may include a reflective member 400 disposed between the substrate 100 and the resin layer 500. The lighting device 1000 may emit the light emitted from the light emitting device 300 as surface light. The light emitting device 300 may be defined as a package having an LED chip, a light source having an LED chip, or a light source emitting visible light. The lighting device 1000 may be defined as a light emitting cell or a light source module. The lighting device 1000 may include one light emitting cell or a plurality of light emitting cells on the substrate 100.

<Substrate 100>

Referring to FIGS. 1 to 6, the substrate 100 may include a printed circuit board (PCB). The substrate 100 may include, for example, at least one of a resin-based printed circuit board (PCB), a PCB having a metal core, a flexible PCB, a ceramic PCB, or an FR-4 substrate. When the substrate 100 is a metal core PCB having a metal layer disposed on the bottom thereof, the heat dissipation efficiency of the light emitting device 300 may be improved. The substrate 100 may be electrically connected to the light emitting device 300. The substrate 100 includes a wiring layer (not shown) thereon, and the wiring layer may be electrically connected to the light emitting device 300. When a plurality of the light emitting devices 300 are arranged on the substrate 100, the plurality of light emitting devices 300 may be connected in series, parallel, or series-parallel by the wiring layer. The substrate 100 may function as a base member or a support member disposed under the light emitting device 300 and the resin layer 500. The upper surface of the substrate 100 may have an X-Y plane. The upper surface of the substrate 100 may be flat or have a curved surface. The thickness of the substrate 100 may be a vertical direction or a height in the Z direction. Here, in the X-Y plane, the X direction may be a first direction, and the Y direction may be a second direction. The Z direction may be a direction orthogonal to the first and second directions. The plurality of light emitting devices 300 may be arranged on the substrate 100 with a predetermined interval X1 in the first direction X. The substrate 100 may be provided in a straight or curved bar shape in a long direction. The substrate 100 may include a translucent material through which light is transmitted through the upper and lower surfaces. The light-transmitting material may include at least one of polyethylene terephthalate (PET), polystyrene (PS), and polyimide (PI).

The substrate 100 may include an insulating layer or a reflective layer for protecting the pad and circuit pattern disposed thereon.

<Light Emitting Device 300>

Referring to FIGS. 1 to 6, the light emitting device 300 is disposed along at least a first direction X on the substrate 100, and emits light in the first direction X. The light emitting devices 300 may be arranged in N rows and/or M columns on the substrate 100. N and M may be 2 or more. The plurality of light emitting devices 300 may be arranged in a matrix having regular intervals on the substrate 100 or may be arranged in a form having irregular intervals. The light emitting device 300 emits light having the highest intensity in one direction. The light emitting device 300 may have an exit surface 381 through which light is emitted, and the exit surface 381 may be disposed, for example, in a third direction or in a vertical direction with respect to the horizontal upper surface of the substrate 100. The exit surface 381 may be a vertical plane, or may include a concave surface or a convex surface. As shown in FIG. 6, one or a plurality of conductive frames 103 may be disposed on the lower portion of the light emitting device 300, and the conductive frame 103 is a lead frame, facing the substrate 100, and may be electrically connected to the pad of the substrate 100 by a conductive bonding member 153. The conductive bonding member 103 may be a solder material or a metal material. As another example, the light emitting device 300 may be disposed as a first light emitting device from one end of the substrate 100 and a second light emitting device in an exit direction of the first light emitting device. The first light emitting device and the second light emitting device irradiate light in the direction of the other end or the first direction of the substrate 100. That is, the first light emitting device irradiates light in the direction of the second light emitting device, and the second light emitting device irradiates light in the direction of the other end of the substrate 100 or the opposite side where the first light emitting device is disposed.

As shown in FIG. 6, the light emitting device 300 may include a device including a light emitting chip 371 in a body or a package in which the light emitting chip 371 is packaged. The light emitting chip 371 is an LED chip and may be molded in a body by a molding member. The exit surface 381 may be a surface of the molding member. The molding member may be made of a transparent resin material such as silicone or epoxy. The light emitting chip 371 may be provided as an LED chip that emits at least one of blue, red, green, ultraviolet (UV), and infrared, and the light emitting device 300 is white, blue, red, green, and infrared. At least one may emit light. The light emitting device 300 may be of a side view type in which a bottom portion is electrically connected to the substrate 100, but is not limited thereto. As another example, the light emitting device 300 may be an LED chip or a top view package.

The exit surface 381 of the light emitting device 300 may be disposed on at least one side of the light emitting device 300 rather than the upper surface. The exit surface 381 may be a side adjacent to the substrate 100 or a side perpendicular to the upper surface of the substrate 100 among the side surfaces of the light emitting device 300. The exit surface 381 is disposed on a side surface between the bottom surface and the upper surface of the light emitting device 300 and emits light of the highest intensity in the first direction X.

Some of the light emitted through the exit surface 381 of the light emitting device 300 travels in a direction parallel to the upper surface of the substrate 100, is reflected by the reflective member 400, or may proceed in a direction of the upper surface of the resin layer 500. The thickness of the light emitting device 300 may be, for example, 3 mm or less, for example, in the range of 0.8 mm to 2 mm. A length k1 of the light emitting device 300 in the second direction may be 1.5 times or more of a thickness of the light emitting device 300. In the light distribution of the light emitting device 300, the light directivity angle in ±Z direction may be wider than the light directivity angle in ±Y direction. The light directivity angle of the light emitting device 300 in the second direction Y may be 110 degrees or more, for example, 120 degrees to 160 degrees or 140 degrees to 170 degrees. The light directivity angle of the light emitting device 300 in the third direction Z may be 110 degrees or more, for example, 120 degrees to 140 degrees.

<Reflective Member 400>

Referring to FIGS. 1 to 6, the reflective member 400 may be a layer separately disposed on the substrate 100 or a layer protecting the upper portion of the substrate 100. The reflective member 400 may be disposed between, for example, the substrate 100 and the resin layer 500. The reflective member 400 may be provided in the form of a film having a metal material or a non-metal material. The reflective member 400 may be adhered to the upper surface of the substrate 100. The reflective member 400 may have an area smaller than an area of the upper surface of the substrate 100. The reflective member 400 may be spaced apart from the edge of the substrate 100, and a resin layer 500 may be attached to the substrate 100 in a region where the reflective member is spaced apart. In this case, it is possible to prevent the edge portion of the reflective member 400 from peeling off. The reflective member 400 may have a dot-shaped reflective pattern disposed on its upper surface, but is not limited thereto. As shown in FIG. 6, the reflective member 400 may include an opening 410 in which a lower portion of the light emitting device 300 is disposed. In the opening 410 of the reflective member 400, the upper surface of the substrate 100 is exposed and a portion to which the frame of the light emitting device 300 is bonded may be disposed. The size of the opening 410 may be the same as or larger than the size of the light emitting device 300, but is not limited thereto. The reflective member 400 may be in contact with the upper surface of the substrate 100 or may be adhered between the resin layer 500 and the substrate 100. Here, the reflective member 400 may be removed when a highly reflective material is coated on the upper surface of the substrate 100. The reflective member 400 may be formed to have a thickness smaller than that of the light emitting device 300. The thickness of the reflective member 400 may include a range of 0.2 mm±0.02 mm. The lower portion of the light emitting device 300 may pass through the opening 410 of the reflective member 400 and an upper portion of the light emitting device 300 may protrude. The exit surface 381 of the light emitting device 300 may be provided in a direction perpendicular to the upper surface of the reflective member 400.

The reflective member 400 may include a metallic material or a non-metallic material. The metallic material may include a metal such as aluminum, silver, or gold. The non-metallic material may include a plastic material or a resin material. The resin material may include a reflective material, for example, a metal oxide such as $TiO_2$, $Al_2O_3$, $SiO_2$, in silicon or epoxy. The reflective member 400 may be implemented as a single layer or a multilayer, and light reflection efficiency may be improved by such a layer structure. The reflective member 400 according to an embodiment of the invention reflects incident light, thereby increasing the amount of light so that the light is emitted uniformly. As another example, the reflective member 400 may be removed from the substrate 100.

<Resin Layer 500>

The resin layer 500 may be disposed on the substrate 100. The resin layer 500 may face or adhere to the substrate 100. The resin layer 500 may be disposed on the entire or partial region of the upper surface of the substrate 100. An area of the lower surface of the resin layer 500 may be the same as an area of the upper surface of the substrate 100, or may be equal to or greater than 80% of an area of the upper surface of the substrate 100. The resin layer 500 may be formed of a transparent material and may guide or diffuse light. The resin layer 500 includes a UV-curable resin material and may be used instead of a light guide plate, and the UV-curable resin material has an effect of convenient adjustment of refractive index and thickness. In addition, the resin layer 500 uses an oligomer as a main material, and mixes IBOA, monomer for dilution, and GMA, so that hardness, heat resistance, and transmittance may be adjusted, and adhesion and oxidation prevention may be suppressed. The resin layer 500 may contain a photo initiator and a light stabilizer to control curing and suppress discoloration. Since the resin layer 500 is provided as a layer for guiding light with a resin, it may be provided with a thinner thickness than in the case of glass and may be provided as a flexible plate. The resin layer 500 may emit the point light emitted from the light emitting device 300 in the form of linear light or surface light. A bead (not shown) may be included in the resin layer 500, and light may be diffused. Since the upper portion of the resin layer 500 is disposed on the light emitting device 300, the light emitting device 300 may be protected and loss of light emitted from the light emitting device 300 may be reduced. The light emitting device 300 may be buried under the resin layer 500. The resin layer 500 may be in contact with the surface of the light emitting device 300 and may be in contact with the exit surface 381 of the light emitting device 300. A portion of the resin layer 500 may be disposed in the opening 410 of the reflective member 400. A portion of the resin layer 500 may be in contact with the upper surface of the substrate 100 through the opening 410 of the reflective member 400. Accordingly, a portion of the resin layer 500 is in contact with the substrate 100, thereby fixing the reflective member 400 between the resin layer 500 and the substrate 100.

The thickness of the resin layer 500 may be 5 mm or less, for example, 2 mm to 5 mm. When the thickness of the resin layer 500 is thicker than the above range, luminous intensity or light blocking characteristics may be reduced, and it may be difficult to provide a flexible module due to an increase in the module thickness. When the thickness of the resin layer 500 is smaller than the above range, it is difficult to provide surface light having a uniform luminous intensity. The length of the resin layer 500 in the first direction X may be disposed along the first direction of the substrate 100, and the length of the second direction Y may be disposed along the second direction of the substrate 100. The resin layer 500 may be disposed in a range of 80% or more, for example, 80% to 100% of the length of the substrate 100 in the first and second directions. Each side surface of the resin layer 500 may be disposed on the same plane or adjacent to each side surface of the substrate 100. The resin layer 500 may be provided in a size to cover the plurality of light emitting devices 300 or may be connected to each other. The resin layer 500 may be divided into a size to cover each light emitting device 300, and may be divided into light emitting cells having each light emitting device 300 and each resin layer 500. The resin layer 500 may include an optical pattern portion 600. The optical pattern portion 600 reflects or refracts incident light to suppress hot spots.

<Optical Pattern Portion 600>

As shown in FIGS. 1, 2 and 5, the optical pattern portion 600 may be formed in a concave pattern on the upper surface of the resin layer 500. The concave pattern may include concave portions 60 arranged to have a predetermined depth on the upper surface of the resin layer 500. The optical pattern portions 600 may be disposed on each of the upper portions of the light emitting devices 300, and may include concave portions 60 formed from the upper surface of the resin layer 500 toward the substrate 100. The convex portions 70 may be disposed between the concave portions 60. Each of the plurality of optical pattern portions 600 may be spaced apart from each other along a direction (e.g., X) in which the light emitting devices 300 are disposed. For example, an interval X2 between the optical pattern portions 600 may be smaller than the interval X1 between the light emitting devices 300. Each of the optical pattern portions 600 may be spaced apart from an outer side surface or an edge of the resin layer 500.

The first portion of the optical pattern portion 600 may be a region overlapping the light emitting device 300 in a vertical direction or a third direction Z. The second portion of the optical pattern portion 600 may be a peripheral region of the first portion, and may be an upper region from which light is emitted based on the first portion. The plurality of optical pattern portions 600 may refract or reflect light incident on top of each of the plurality of light emitting devices 300 to suppress hot spots on each of the upper portions of the light emitting devices 300. As shown in FIGS. 2 and 7, each of the optical pattern portions 600 may have a maximum length b2 in the second direction Y greater than a maximum length b1 in the first direction X. Each of the optical pattern portions 600 may be disposed in a region having a radius of 10 mm or less in a long axis direction (e.g., a second direction) from the center of each of the optical pattern portions 600 and a radius of 6 mm or less in the minor axis direction. The maximum length b1 of the optical pattern portion 600 in the first direction X may be 8 mm or more, for example, in the range of 8 mm to 12 mm. The maximum length b2 of the optical pattern portion 600 in the second direction Y may be 10 mm or more, for example, in the range of 10 mm to 20 mm or in the range of 12 mm to 20 mm. Each of the optical pattern portions 600 may have a size corresponding to a characteristic of the light directivity angle of the light emitting device 300, that is, the light directivity angle in the second direction Y with respect to the optical axis is larger than the directivity angle in the third direction Z. Accordingly, the optical pattern portion 600 may effectively refract or reflect light traveling in the third direction Z from the front of the light emitting device 300 with respect to the optical axis, and may effectively refract or reflect light proceeding in the second direction Y. Accordingly, the optical pattern portion 600 may improve the light diffusion efficiency by lowering the straightness of the incident light.

As shown in FIG. 2, the width k2 of the first portion overlapping the upper portion of the light emitting device 300 of the optical pattern portion 600 may be greater than the length k1 of the light emitting device 300. Accordingly, the light progressing upwards of the light emitting device 300 may be effectively refracted and diffused in other directions. Here, when the light emitting devices 300 are arranged in the first direction X, it may be defined as a first light emitting device and a second light emitting device. When the optical pattern portions 600 are arranged in the first direction X, it may be defined as a first optical pattern portion and a second optical pattern portion. The first light emitting device emits light toward the front or the rear of the second light emitting device, and the second light emitting device emits light toward the front. The first optical pattern portion covers the upper surface and the front upper portion of the first light emitting device on the upper surface of the resin layer 500, and the second optical pattern portion covers the upper surface and the front upper portion of the second light emitting device on the upper surface of the resin layer 500. The first and second optical pattern portions may refract or reflect light incident from each of the first and second light emitting devices to diffuse the light.

In the lighting device 1000 according to an embodiment of the invention, since the optical pattern portion 600 having an uneven pattern is disposed on the surface of the resin layer 500, a structure including a layer for separately forming a light blocking member on the resin layer 500 or an adhesive layer for bonding a layer having a light blocking member to the resin layer may be removed. For light diffusion, a diffusion plate may be further provided on the resin layer 500, or an inner or outer lens may be further provided on the resin layer 500. Accordingly, it is possible to provide a thin thickness of the lighting device 1000, and the refracted light travels in the direction of the light, thereby improving the distribution of the light.

As shown in FIGS. 1 to 4, the optical pattern portion 600 includes a plurality of concave portions 60, and the top view shape of the concave portion 60 may be a polygonal shape (e.g., a triangle, a square or a pentagon), a circular shape or an elliptical shape. The upper surface area of each of the concave portions 60 may be provided with the same size or different sizes. The upper surface area of each of the concave portions 60 may be disposed to have the same size according to regions, and may be provided to have different sizes in different regions. The concave portions 60 may be spaced apart from each other by a predetermined interval, and the interval may be smaller than lengths of the concave portions 60 in the first and second directions X and Y. Interval between the concave portions 60 may be equal to each other. The interval between the concave portions 60 may include a region having a constant interval and a region having a smaller or larger interval than the constant interval. The concave portions 60 may have the same or different intervals in the first direction X and in the second direction Y.

As shown in FIGS. 2 and 3, in the optical pattern portion 600, concave portions 60 and convex portions 70 may be alternately arranged in the first direction X. In the optical pattern portion 600, the concave portions 60 and the convex portions 70 may be alternately arranged in the second direction Y. A side cross-section of each of the concave portions 60 may have a polygonal shape. The width of the concave portions 60 in the first direction X and/or the second direction Y may be smaller than the depth h1. The concave portions 60 may have a columnar shape having a deep depth h1. The concave portion 60 may have an upper width and the same lower width. A bottom 6 of the concave portion 60 may include a flat surface. The upper surface 7 of the convex portion 70 between the concave portions 60 may have a constant width or may have different widths according to regions. The convex portions 70 may be connected to each other, and the concave portions 60 may be provided in a shape recessed in the lower surface direction in the inner region of the convex portions 70. The concave portion 60 may reflect or refract incident light, and may diffuse the incident light. The convex portion 70 may reflect or refract incident light, or guide it upward to diffuse it.

As shown in FIGS. 2 and 4, a side cross-section of each of the concave portions 60A of the optical pattern portion 600 may have a columnar shape. A lower portion of the concave portions 60A may have a hemispherical shape, and the bottom 6A may include a concave curved surface. The width of the concave portions 60A in the first direction and/or the second direction may be smaller than the depth h1. The concave portion 60A may have an upper width greater than a lower minimum width. The upper surface 7A of the convex portion 70A between the concave portions 60A may have a constant width or may have different widths according to regions. The convex portions 70A may be connected to each other, and the concave portions 60A may be provided in a shape recessed in the lower surface direction within the region of the convex portion 70A. The curvature of the curved surface of the concave portion 60A may be 0.08 or more, for example, in the range of 0.08 to 0.12. It is possible to improve the emitting efficiency of light incident by the curved surface having such a curvature. Here, the curvature of the concave portion 60A may be a curvature between the bottom 6A and the side surface, or a curvature of a corner portion between the side surfaces in the concave portion 60A. The width of the concave portion 60A may be 0.25 mm or more, for example, in the range of 0.25 mm to 0.45 mm.

Referring to FIG. 4, the angle at which the light incident on the concave curved surface of the concave portion 60A is refracted and the angle at which the light is emitted are the same as in Equations 1 to 3 for light extraction.

$$90-\theta 4=a\sin(1.47\sin(90-\theta 3)) \quad \text{Equation 1}$$

$$47.1^\circ < 90-\theta 3 < 90^\circ \quad \text{Equation 2}$$

$$0^\circ < 90-\theta 3 < 47.1^\circ \quad \text{Equation 3}$$

Here, 1.47 is the refractive index of the resin layer 500. The angle 63 is an angle of light incident with respect to a tangent passing through the curved surface of the concave portion 60A, and the angle 64 is an angle of light refracted with respect to a tangent passing through the curved surface of the concave portion 60A, and the angle 65 is the angle between the light transmitted through the concave portion 60A and the horizontal upper surface of the resin layer 500. The angle 65 may be in the range of 35±15 degrees. The condition of Equation 2 is an angle at which light incident on the concave portion 60A is totally reflected, and the transmittance of the light may be lowered. Here, the bottom curvature of the concave portion 60A may be designed in consideration of the critical angle of the material of the resin layer 500. The condition of Equation 3 is an angle at which light incident on the concave portion 60A is transmitted, and the light may be refracted and emitted to the outside. By the angle 65 between the refracted and transmitted light and the horizontal upper surface of the resin layer 500, the efficiency of emitting light emitted from the light emitting device 300 in front direction may be increased, so that the light distribution of the lighting device may have directionality. That is, when the lighting device is disposed on the side of the vehicle lamp, the light emitted from the light emitting device 300 may be emitted at the angle 85. Accordingly, the lighting device disposed on the rear side of the vehicle lamp may provide the directionality of the light distribution that proceeds in the rear direction.

As shown in FIGS. 3 and 4, the depth h1 of the concave portions 60 and 60A of the optical pattern portion 600 may be 0.25 mm or more, for example, in the range of 0.25 mm to 0.8 mm. The depth h1 of the concave portions 60 and 60A of the optical pattern portion 600 may be constant or may have different depths depending on the regions. For example, when the concave portions 60 and 60A have different depths h1 depending on the regions, the first region adjacent to the light emitting device 300 is deep and the second region(s) farther from the light emitting device 300 may have a smaller depth than a depth of the first region. The concave portions 60 and 60A may be formed by etching or may be formed by a molding process of the resin layer 500.

FIGS. 7 to 9 are views showing the optical pattern portion according to the first example of the invention.

Referring to FIGS. 7 to 9, in the optical pattern portion 600, the maximum length b2 in the second direction Y may be greater than the maximum length b1 in the first direction X, for example, the maximum length b2 in the second direction Y may be 120% or more, for example, 120% to 180% of the maximum length b1 in the first direction X. The area of the region connecting the outermost patterns of the optical pattern portion 600 may be 6 times or more, for example, 6 times to 18 times the upper surface area of the light emitting device 300. Accordingly, the optical pattern portion 600 may cover the upper portion and the front region of the light emitting device 300 to reflect or refract the incident light. In the optical pattern portion 600, widths w1, w2, w3, and w4 of the plurality of pattern portions 610, 620, 630, and 640 arranged in the first direction X may be different from each other. The plurality of pattern portions 610, 620, 630, and 640 may extend in the second direction Y. For example, the plurality of pattern portions 610, 620, 630, and 640 may be disposed at the same depth h1, and the pitches P1, P2, P3, and P4 between the concave portions 61, 62, 63, and 64 adjacent in the first and second directions X and Y may be the same or may become wider as a distance from the exit surface 381 of the light emitting device 300 increases. Each of the plurality of pattern portions 610, 620, 630 and 640 includes concave portions 61, 62, 63, 64 and convex portions 71, 72, 73, 74, and the concave portions 61, 62, 63, 64 and the convex portions 71, 72, 73, and 74 may be alternately disposed. Intermediate convex portions 77, 78, and 79 between the plurality of pattern portions 610, 620, 630, and 640 are larger than at least two of the widths w1, w2, w3 and w4 of the adjacent concave portions 61, 62, 63 and 64, and may be equal to or greater than the width of at least one of the widths of the adjacent convex portions 71, 72, 73, and 74.

The optical pattern portion 600 may disposed in the order of a first pattern portion 610, a second pattern portion 620, a third pattern portion 630, and a fourth pattern portion 640 in a first direction X from the center of the position where the light emitting device 300 is placed. The optical pattern portion 600 may be disposed in the order of a first pattern portion 610, a second pattern portion 620, a third pattern portion 630 and a fourth pattern portion 640 on both sides in the second direction Y from the position where the light emitting device 300 is placed or the center of the optical pattern portion 600. Intermediate convex portions 77, 78, and 79 may be disposed between the first to fourth pattern portions 610, 620, 630 and 640, respectively. In each of the first to fourth pattern portions 610, 620, 630 and 640, concave portions 61, 62, 63, 64 and convex portions 71, 72, 73 and 74 may be alternately disposed. The first pattern portion 610 includes a plurality of first concave portions 61 and a plurality of first convex portions 71, and the width w1 of the first concave portion 61 may be greater than a width of the first convex portion 71 disposed between the first concave portions 61. The second pattern portion 620 includes a plurality of second concave portions 62 and a plurality of second convex portions 72, and the width w2 of the second concave portion 62 may be greater than a width of the second convex portion 72 disposed between the second concave portions 62.

The third pattern portion 630 includes a plurality of third concave portions 63 and a plurality of fourth convex portions 73, and the width w3 of the third concave portion 63 may be smaller than a width of the third convex portion 73 disposed between the third concave portions 63. The fourth pattern portion 640 includes a plurality of fourth concave portions 64 and at least one fourth convex portion 74, and the width of the fourth concave portion 64 may be smaller than a width of the fourth convex portion 74 disposed between the fourth concave portion 64.

Widths w1, w2, w3 and w4 of the first to fourth concave portions 61, 62, 63, and 64 may gradually decrease in the first direction X based on a position overlapping the center of the light emitting device 300. Widths w1, w2, w3 and w4 of the first to fourth concave portions 61, 62, 63, and 64 may gradually decrease from a position overlapping with the center of the light emitting device 300 or from the center of the optical pattern portion 600 toward both sides of the second direction Y. For example, the width of each of the first to fourth concave portions 61, 62, 63, and 64 may satisfy the following condition: $w1>w2>w3>w4$. The width w1 is 0.4 mm or more, for example, in the range of 0.4 mm to 0.6 mm, the width w2 is less than 0.4 mm, for example, in the range of 0.32 mm to 0.39 mm, and the width w3 is 0.3 mm or less, for example, in the range of 0.29 mm to 0.38 mm, and the width w4 may be 0.2 mm or more, for example, in the range of 0.2 mm to 0.28 mm. The width w1 of the first concave portion 61 may be at least twice the width w4 of the fourth concave portion 64. The widths d1, d2, and d3 of the intermediate convex portions 77, 78, and 79 may satisfy the following condition: $d1<d2<d3$, and may be a minimum of 0.01 mm or more and a maximum of 0.5 mm or less. That is, the maximum width d3 may be in the range of 0.4 mm to 0.5 mm, and the minimum width d1 may be in the range of 0.01 to 0.2 mm. This minimum width d1 may be a range in which concave portions between the convex portions 77 may be etched or formed.

The depth h1 of the first to fourth concave portions 61, 62, 63, and 64 may be 0.25 mm or more, for example, in the range of 0.25 mm to 0.35 mm. When an area of the upper surface of the optical pattern portion 600 is 100%, the area of the upper surface of the first pattern portion 610 may be in the range of 40%±5% compared to an area of the upper surface of the optical pattern portion 600, and, an area of the upper surface of the second pattern portion 620 may be in the range of 25%±4% compared to the area of the upper surface of the optical pattern portion 600, and an area of the upper surface of the third pattern portion 630 may be in the range of 20%±3% compared to the area of the optical pattern portion 600, and an area of the upper surface of the fourth pattern portion 640 may be in the range of 15%±3% compared to the area of the upper surface of the optical pattern portion 600.

In the first example, the depth h1 of the optical pattern portion 600 having the plurality of pattern portions 610, 620, 630, and 640 is the same, and the pattern portions having the concave portions 61, 62, 63, and 64 farther away from an overlapping position with the center of the light emitting device 300 may be provided with a gradually smaller width. Accordingly, an area of the concave portion of the first pattern portion 610 is the largest in the region adjacent to the light emitting device 300, and an area of the concave portion may be reduced as the region is farther from the light emitting device 300, so that patterns capable of diffusing light in proportion to the light intensity may be disposed.

Figure 10:
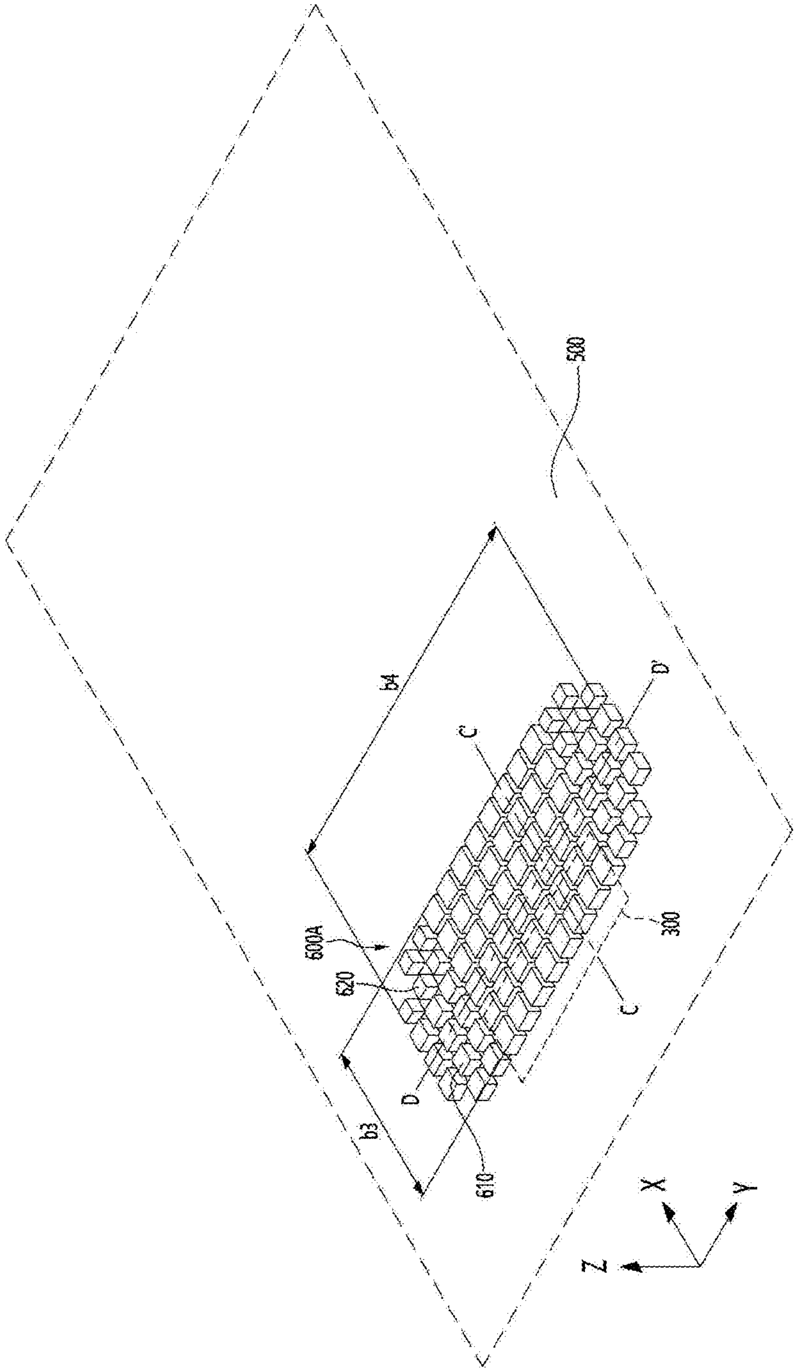
FIG. 10 is a view showing an example of a lighting module having a resin layer having a second example of the optical pattern portion of the invention.
Figure 11:
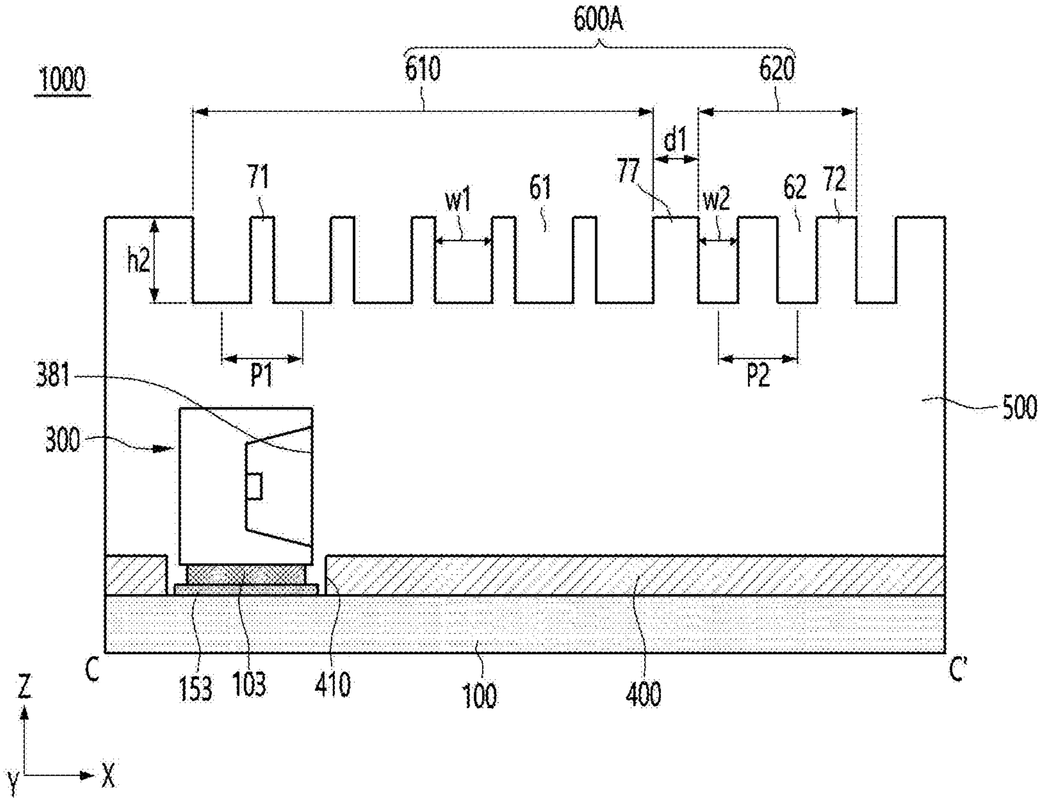
FIG. 11 is a cross-sectional view taken along the line C-C' of FIG. 10.
Figure 12:
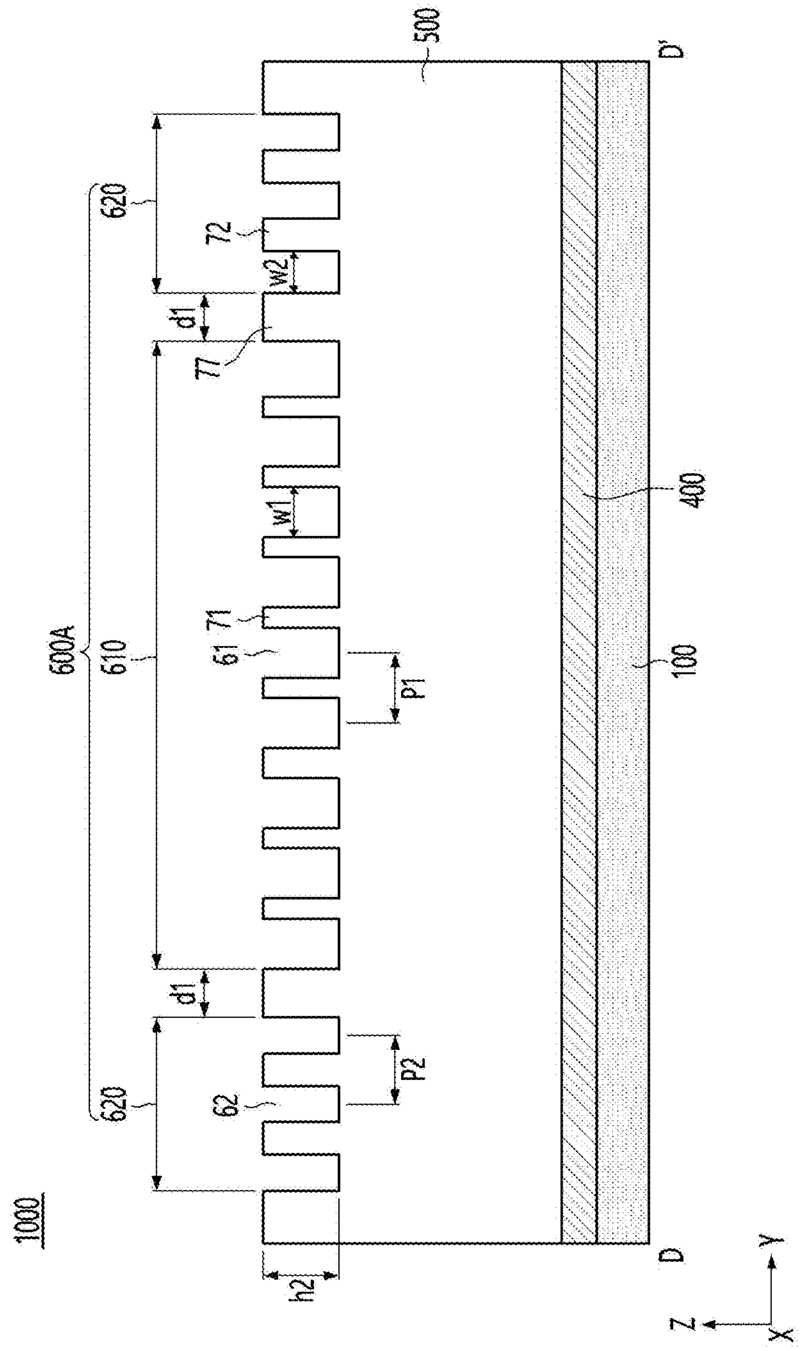
FIG. 12 is a cross-sectional view taken along the line D-D' of FIG. 10.

FIGS. 10 to 12 are views illustrating an optical pattern portion according to a second example.

Referring to FIGS. 10 to 12, in the optical pattern portion 600A disposed on the resin layer 500, the maximum length b4 in the second direction Y may be equal to or greater than the maximum length b3 in the first direction X, for example, the maximum length b4 in the second direction Y may be 200% or more, for example, in the range of 200% to 330% of the maximum length b3 in the first direction X. The maximum length b3 in the first direction X may be equal to or greater than the length k1 (in FIG. 2) of the light emitting device 300. For example, the maximum length b3 in the first direction X may be 3.5 mm or less, for example, in the range of 2.5 mm to 3.5 mm, and the maximum length b4 in the second direction Y may be 7 mm or more, for example, in the range from 7 mm to 9 mm. The area of the region connecting the outermost patterns of the optical pattern portion 600 may be one or more times, for example, one to three times the area of the upper surface of the light emitting device 300. Accordingly, the optical pattern portion 600A may cover the upper portion and the front region of the light emitting device 300 to reflect or refract the incident light.

In the optical pattern portion 600A, widths w1 and w2 of the plurality of pattern portions 610 and 620 arranged in the first direction X may be different from each other. The plurality of pattern portions 610 and 620 may extend in the second direction Y. For example, the plurality of pattern portions 610 and 620 may be disposed to have the same depth h2 as each other, and the pitches p1 and p2 between the concave portions 62 adjacent in the first and second directions X and Y may be the same or may be gradually increased. Each of the plurality of pattern portions 610 and 620 includes concave portions 61 and 62 and convex portions 71 and 72, and the concave portions 61 and 62 and the convex portions 71 and 72 may be alternately disposed. The intermediate convex portion 77 between the plurality of patterns may be greater than the widths w1 and w2 of the adjacent concave portions 61 and 62, and may be equal to or greater than the width of at least one of the adjacent convex portions 71. The optical pattern portion 600A has a first pattern portion 610 and a second pattern portion 620 disposed in a first direction, and an intermediate convex portion 77 may be disposed between each of the first pattern portions 610 and each of the second pattern portions 620. The concave portions 61 and 62 and the convex portions 71 and 72 may be alternately disposed in each of the first and second pattern portions 610 and 620.

The first pattern portion 610 includes a plurality of first concave portions 61 and a plurality of first convex portions 71, and the width w1 of the first concave portion 61 may be greater than a width of the first convex portions 71 disposed between the first concave portions 61. The second pattern portion 620 includes a plurality of second concave portions 62 and a plurality of second convex portions 72, and the width w2 of the second concave portion 62 may be greater than a width of the second convex portion 72 disposed between the second concave portions 62.

Widths w1 and w2 of the first concave portion 61 and the second concave portion 62 in the first direction X may be gradually smaller based on a position overlapping the center of the light emitting device 300. The widths (w1>w2) of the first concave portion 61 and the second concave portion 62 arranged toward both sides in the second direction Y may be gradually decreased from a position overlapping the center of the light emitting device 300 or from the center of the optical pattern portion 600A. For example, the width of each of the first and second concave portions 61 and 62 may satisfy the following condition: w1>w2. The width w1 may be 0.4 mm or more, for example, in the range of 0.4 mm to 0.6 mm, and the width w2 may be less than 0.4 mm, for example, in the range of 0.25 mm to 0.39 mm. The width w1 of the first concave portion 61 may be less than or equal to twice the width w2 of the second concave portion 62. The width d1 of the intermediate convex portion 77 may be in the range of 0.01 mm to 0.5 mm, and may be larger than the widths of the first and second convex portions 71 and 72. The depth h2 of the first and second concave portions 61 and 62 may be 0.4 mm or more, for example, in the range of 0.4 mm to 0.5 mm. When an area of the upper surface of the optical pattern portion 600A is 100%, the upper surface area of the first pattern portion 610 may be in the range of 80%±5% compared to an area of the upper surface of the optical pattern portion 600A, and an area of the upper surface of the second pattern portion 620 may be in the range of 20%±4% compared to an area of the upper surface of the optical pattern portion 600A.

In the second example, the depth h2 of the optical pattern portion 600A having the plurality of pattern portions 610 and 620 is deeper than the depth h1 of the first example and is equal to each other, and may be gradually reduced as the distance from the overlapping position with the center of the light emitting device 300 increases. Accordingly, an area of the first concave portion 61 of the pattern portions 610 and 620 is the largest in a region adjacent to the light emitting device 300, and the area of the second concave portion 62 may be reduced as the region is farther away the light emitting device 300, so that patterns capable of diffusing light in proportion to the light intensity may be disposed.

Figure 13:
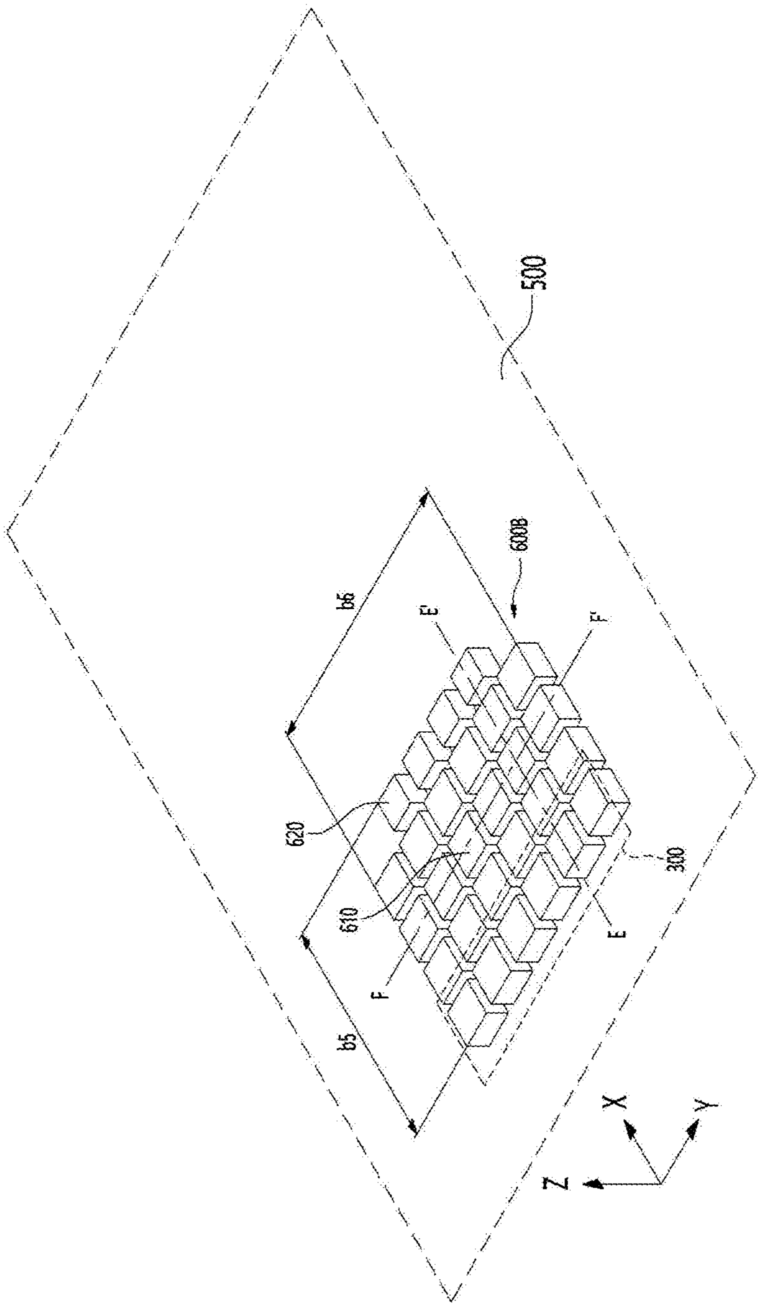
FIG. 13 is a view showing an example of a lighting module having a resin layer having a third example of the optical pattern portion of the invention.
Figure 14:
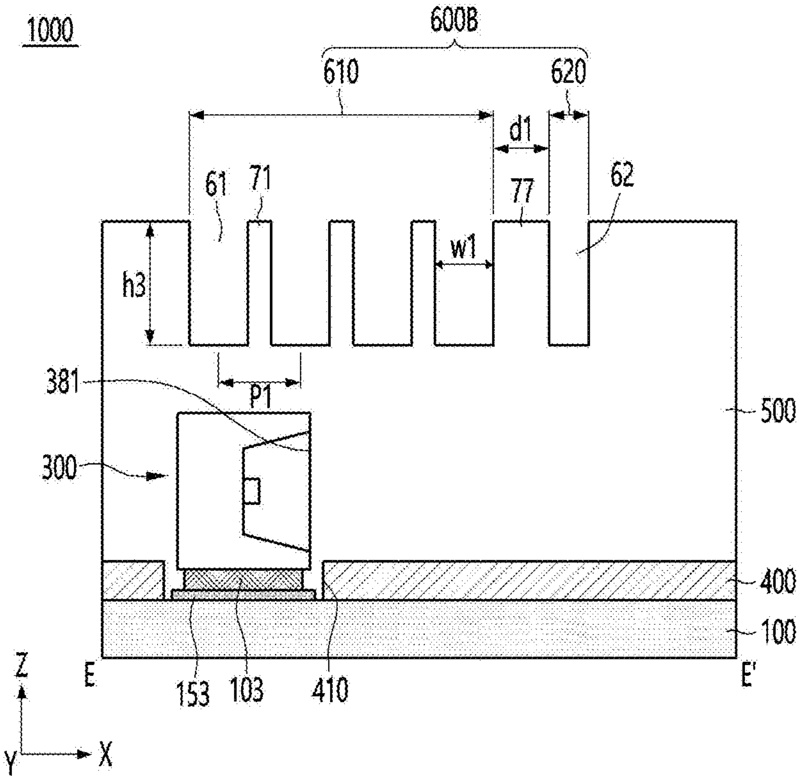
FIG. 14 is a cross-sectional view along E-E' of FIG. 13.
Figure 15:
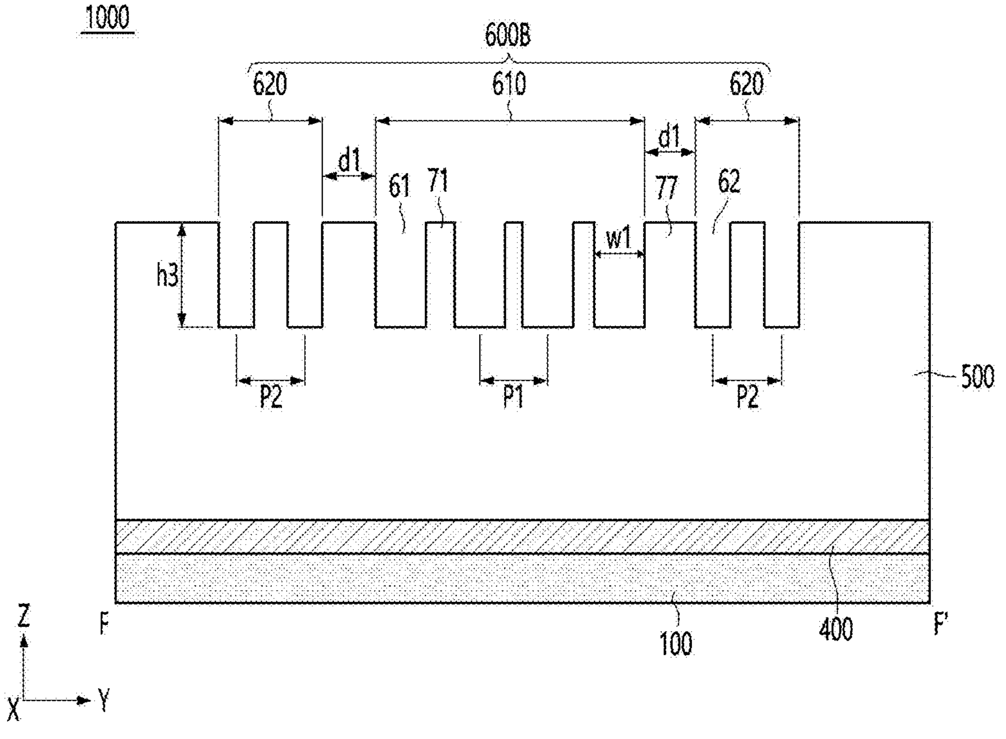
FIG. 15 is a cross-sectional view taken along the line F-F' of FIG. 13.

FIGS. 13 to 15 are views illustrating an optical pattern portion according to a third example.

Referring to FIGS. 13 to 15, in the optical pattern portion 600B disposed on the resin layer 500, the maximum length b6 in the second direction Y may be greater than the maximum length b5 in the first direction X, for example, the maximum length b6 in the second direction Y may be 100% or more than the maximum length b5 in the first direction X, for example, in the range of 100% to 150%. The maximum length b5 in the first direction X may be 80% or more, for example, 80% to 110% of the length k1 (in FIG. 2) of the light emitting device 300. For example, the maximum length b5 in the first direction X may be in the range of 2.5 mm or less, for example, 1.8 mm to 2.5 mm, and the maximum length b6 in the second direction Y is 7 mm or more, for example, in the range from 7 mm to 9 mm. The area of the region connecting the outermost patterns of the optical pattern portion 600B may be 0.5 times or more, for example, in the range of 0.5 times to 1.5 times an area of the upper surface of the light emitting device 300. Accordingly, the optical pattern portion 600B may cover an upper portion of the light emitting device 300 and a front region thereof to reflect or refract incident light.

In the optical pattern portion 600B, widths w1 and w2 of the plurality of pattern portions 610 and 620 arranged in the first direction X may be different from each other. The plurality of pattern portions 610 and 620 may extend in the second direction Y. For example, the plurality of pattern portions 610 and 620 may be disposed to have the same depth h3 as each other, and the pitch p1 between the concave portions 62 adjacent in the first and second directions X and Y may be the same. Each of the plurality of pattern portions 610 and 620 includes concave portions 61 and 62 and convex portions 71 and 72, and the concave portions 61 and 62 and the convex portions 71 and 72 may be alternately disposed. The intermediate convex portion 77 between the plurality of pattern portions 610 and 620 may be smaller than the width w1 of at least one of the adjacent concave portions 61 and 62 and greater than the width of the adjacent convex portions 71 and 72. The optical pattern portion 600B has a first pattern portion 610 and a second pattern portion 620 disposed in a first direction, and an intermediate convex portion 77 may be disposed between each of the first and second pattern portions 610 and 620. The concave portions 61 and 62 and convex portions 71 and 72 may be alternately disposed in the first and second directions. The first pattern portion 610 includes a plurality of first concave portions 61 and a plurality of first convex portions 71, and the width w1 of the first concave portion 61 may be greater than a width of the first convex portion 71 disposed between the first concave portions 61. The second pattern portion 620 includes a plurality of second concave portions 62 and a plurality of second convex portions 72, and the width w2 of the second concave portion 62 may be equal to or different from a width of the second convex portion 72 disposed between the second concave portions 62. Widths w1 and w2 of the first concave portion 61 and the second concave portion 62 in the first direction X may be gradually smaller based on a position overlapping the center of the light emitting device 300. The width (w1>w2) of first concave portion 61 and the second concave portion 62 arranged toward both sides in the second direction Y from a position overlapping the center of the light emitting device 300 or from the center of the optical pattern portion 600B may gradually decrease. For example, the width of each of the first and second concave portions 61 and 62 may satisfy the following conduction: w1>w2. The width w1 may be 0.4 mm or more, for example, in the range of 0.4 mm to 0.6 mm, and the width w2 may be less than 0.4 mm, for example, in the range of 0.25 mm to 0.39 mm. The width w1 of the first concave portion 61 may be less than or equal to twice the width w2 of the second concave portion 62. The width d1 of the intermediate convex portion 77 may be in the range of 0.01 mm to 0.5 mm, and may be greater than the widths of the first and second convex portions 71 and 72.

The depth h3 of the first and second concave portions 61 and 62 may be 0.55 mm or more, for example, in the range of 0.55 mm to 0.65 mm. When an area of the upper surface of the optical pattern portion 600B is 100%, an area of the upper surface of the first pattern portion 610 may be in the range of 85%±5% compared to the area of the upper surface of the optical pattern portion 600B, and an area of the upper surface of the second pattern portion 620 may be in the range of 15%±4% compared to the area of the upper surface of the optical pattern portion 600B.

In the third example, the depth h3 of the optical pattern portion 600B having the plurality of pattern portions 610 and 620 is deeper than the depth h2 of the second example and is equal to each other, and may be gradually reduced as the distance from overlapping position with the center of the light emitting device 300 increases. Accordingly, an area of the first concave portion 61 of the pattern portions 610 and 620 is the largest in the region adjacent to the light emitting device 300, and the area of the second concave portion 62 may be reduced as the region is farther away the light emitting device 300, so that patterns capable of diffusing light in proportion to the light intensity may be disposed.

Figure 16:
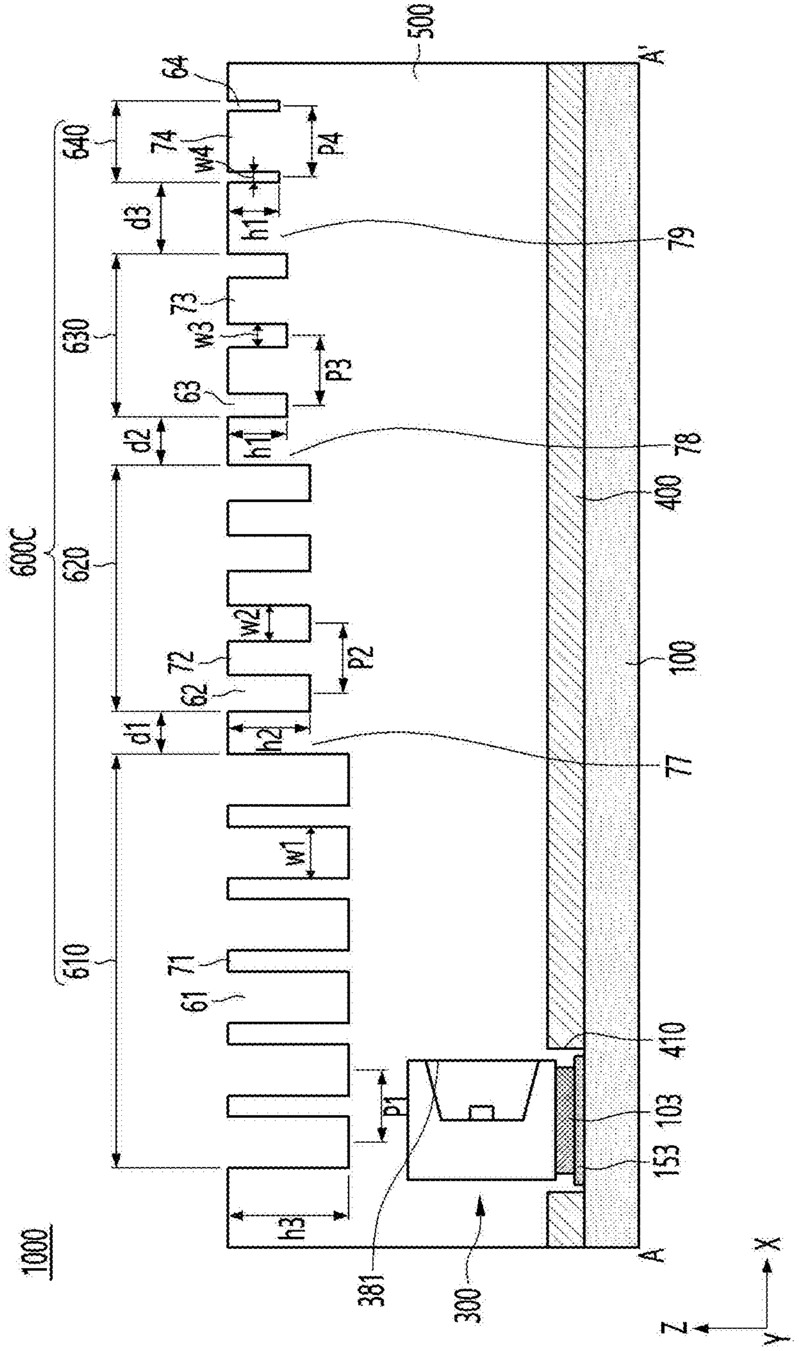
FIG. 16 is a fourth example of an optical pattern portion of the invention, and is an example of a cross-sectional view taken along line A-A' side in FIG. 5.
Figure 17:
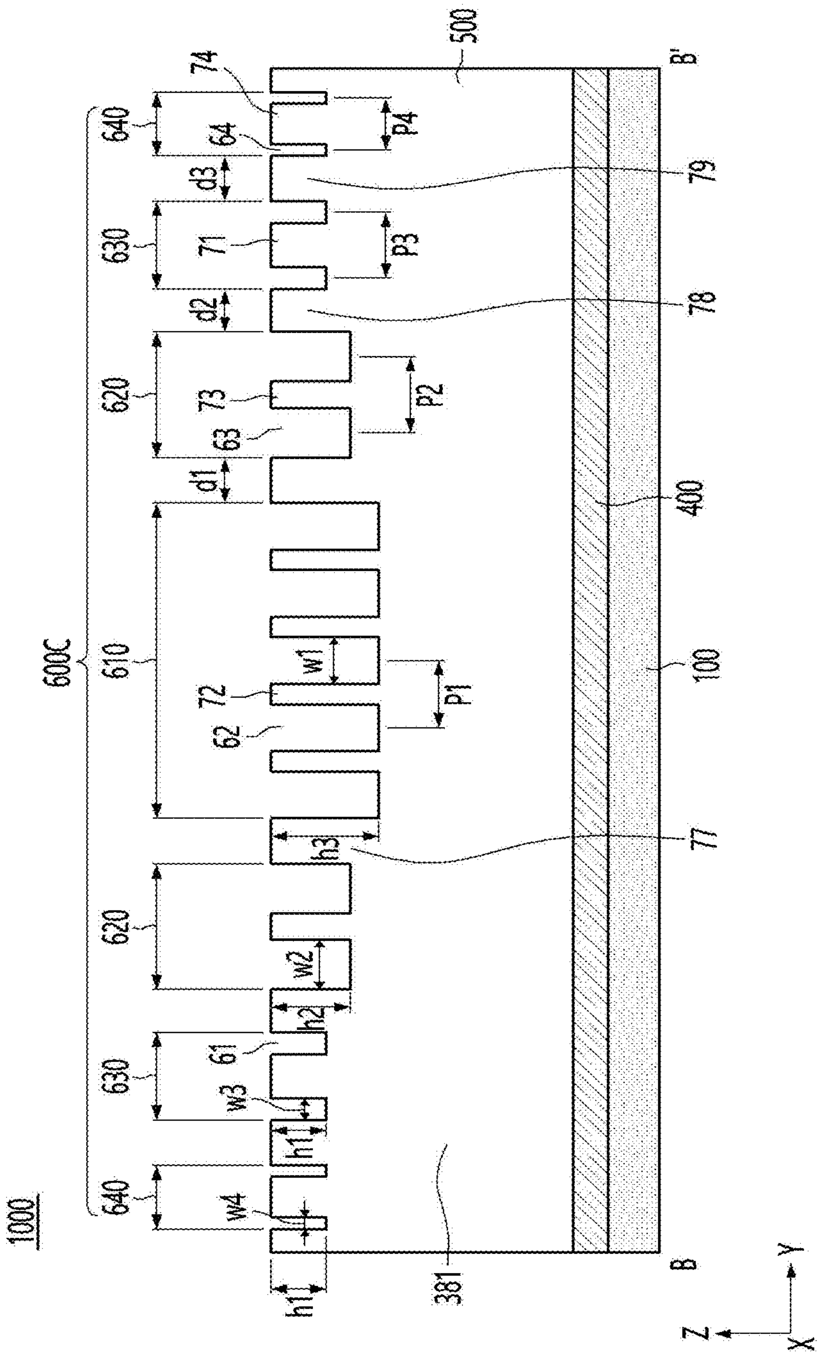
FIG. 17 is a fourth example of the optical pattern portion of the invention, and is an example of a cross-sectional view taken along line B-B' in FIG. 5.

FIGS. 16 and 17 are views illustrating an optical pattern portion according to a fourth example.

Referring to FIGS. 2, 16 and 17, in the optical pattern portion 6000, the maximum length b2 in the second direction Y may be greater than the maximum length b1 in the first direction X, for example, the maximum length b2 in the second direction Y may be 120% or more, for example, 120% to 180% of the maximum length b1 in the first direction X. An area of the region connecting the outermost patterns of the optical pattern portion 6000 may be 6 times or more, for example, 6 to 18 times an area of the upper surface of the light emitting device 300. Accordingly, the optical pattern portion 6000 may cover the upper portion and the front region of the light emitting device 300 to reflect or refract the incident light.

In the optical pattern portion 6000, widths w1, w2, w3, and w4 of the plurality of pattern portions 610, 620, 630, and 640 arranged in the first direction X may be different from each other. The plurality of pattern portions 610, 620, 630, and 640 may extend in the second direction. For example, the plurality of pattern portions 610, 620, 630, and 640 may have a different depths h1, h2, h3 and h4, and the pitches P1, P2, P3, and P4 between the concave portions 62 adjacent in the first and second directions may be different from each other.

Each of the plurality of pattern portions 610, 620, 630 and 640 includes concave portions 61, 62, 63, 64 and convex portions 71, 72, 73, 74, and the concave portions 61, 62, 63, 64 and the convex portions 71, 72, 73, and 74 may be alternately disposed. The intermediate convex portions 77, 78, and 79 between the plurality of pattern portions 610, 620, 630, and 640 may have a smaller widths d1, d2, and d3 than the widths w1 and w2 of the adjacent first and second concave portions 61 and 62, and may have widths d1, d2, and d3 greater than widths w3 and w4 of the adjacent third and fourth concave portions 63 and 64. The width d1, d2, and d3 of the intermediate convex portions 77, 78, 79 is the smallest width d1 of the first intermediate convex portion 77 between the first and second pattern portions 610 and 620, and the width d3 of the third intermediate convex portion 79 between the third and fourth pattern portions 630 and 640 may be the largest. In this configuration, in consideration of the widths w1, w2, w3, and w4 and the pitches p1, p2, p3, and p4 of the concave portions 61, 62, 63, 64, the width d1, d2, and d3 of the intermediate convex portions 77, 78 and 79 may be set.

The optical pattern portion 6000 may disposed in the order of a first pattern portion 610, a second pattern portion 620, a third pattern portion 630, and a fourth pattern portion 640 in a first direction X and the first pattern portion 610, the second pattern portion 620, the third pattern portion 630, and may disposed in the order of a first pattern portion 610, a second pattern portion 620, a third pattern portion 630 and a fourth pattern portion 640 on both sides in the second direction Y. Intermediate convex portions 77, 78, and 79 may be disposed between the first to fourth pattern portions 610, 620, 630 and 640, respectively. In each of the first to fourth pattern portions 610, 620, 630, and 640, concave portions 61, 62, 63, 64 and convex portions 71, 72, 73, and 74 may be alternately disposed in first and second directions X and Y. The first pattern portion 610 includes a plurality of first concave portions 61 and a plurality of first convex portions 71, and the width w1 of the first concave portion 61 may be greater than a width the first convex portion 71 disposed between the first concave portions 61. The second pattern portion 620 includes a plurality of second concave portions 62 and a plurality of second convex portions 72, and the width w2 of the second concave portion 62 may be greater than a width of the second convex portion 72 disposed between the second concave portion 62.

The third pattern portion 630 includes a plurality of third concave portions 63 and a plurality of third convex portions 73, and the width w3 of the third concave portion 63 may be smaller than a width of the third convex portion 73 disposed between the third concave portions 63. The fourth pattern portion 640 includes a plurality of fourth concave portions 64 and at least one fourth convex portion 74, and the width w4 of the fourth concave portion 64 may be smaller than a width of the fourth convex portion 74 disposed between the fourth concave portions 64.

Widths w1, w2, w3 and w4 of the first to fourth concave portions 61, 62, 63, and 64 may gradually decrease as the distance from the position overlapping the center of the light emitting device 300 in the first direction X increases. Widths w1, w2, w3 and w4 of the first to fourth concave portions 61, 62, 63, and 64 may gradually decrease from a position overlapping with the center of the light emitting device 300 or from the center of the optical pattern portion 600 toward both sides of the second direction Y. For example, a width of each of the first to fourth concave portions 61, 62, 63, and 64 may satisfy the following condition: $w1>w2>w3>w4$. The width w1 is 0.4 mm or more, for example, in the range of 0.4 mm to 0.6 mm, the width w2 is less than 0.4 mm, for example, in the range of 0.32 mm to 0.39 mm, and the width w3 is 0.3 mm or less, for example, in the range of 0.29 mm to 0.38 mm, and the width w4 may be 0.2 mm or more, for example, in the range of 0.2 mm to 0.28 mm. The width w1 of the first concave portion may be at least twice the width w4 of the fourth concave portion. The widths d1, d2, and d3 of the intermediate convex portions 77, 78, and 79 may satisfy the following condition: $d1<d2<d3$, and may be a minimum of 0.01 mm or more and a maximum of 0.5 mm or less. That is, the maximum width d3 may be in the range of 0.4 mm to 0.5 mm, and the minimum width d1 may be in the range of 0.01 to 0.2 mm. This minimum width d1 may be a range in which concave portions between the convex portions 77 may be etched or formed. The depths h1, h2, and h3 of the first to fourth concave portions 61, 62, 63, and 64 are equal to the depths h1 of the third or fourth concave portions 63 and 64, or the third concave portion 63 may be deeper than the four concave portion 64. The depth h1 of the third or fourth concave portions 63 and 64 may be smaller than the depths h3 and h2 of the first and second concave portions 61 and 62. A depth h3 of the first concave portion 61 may be greater than a depth h2 of the second concave portion 62.

Depths h3, h2 and h1 of the first to fourth concave portions 61, 62, 63, and 64 as the distance in the first direction X increases with respect to the position overlapping the center of the light emitting device 300 may be gradually reduced. Depths h3, h2 and h1 of the first to fourth concave portions 61, 62, 63, and 64 may be gradually reduced as the distance from a position overlapping position with the center of the light emitting device 300 or from the center of the optical pattern portion 6000 increases toward both sides in the second direction Y. The depth h1 of the third and fourth concave portions 63 and 64 may be 0.25 mm or more, for example, in the range of 0.25 mm to 0.35 mm. The depth h2 of the second concave portion 62 may be 0.4 mm or more, for example, in the range of 0.4 mm to 0.5 mm. The depth h3 of the first concave portion 61 may be 0.55 mm or more, for example, in the range of 0.55 mm to 0.65 mm. When an area of the upper surface of the optical pattern portion 600 is 100%, an area of the upper surface of the first pattern portion 610 may be in the range of 40%±5% compared to an area of the upper surface of the optical pattern portion 6000, and an area of the upper surface of the second pattern portion 620 may be in the range of 25%±4% compared to the area of the upper surface of the optical pattern portion 6000, and an area of the upper surface of the third pattern portion 630 may be in the range of 20%±3% compared to the area of the upper surface of the third optical portion 6000, and an area of the upper surface of the fourth pattern portion 640 may be in the range of 15%±3% compared to the area of the upper surface of the optical pattern portion 6000.

In the fourth example, the depths h1, h2, and h3 of the optical pattern portion 6000 having the plurality of pattern portions 610, 620, 630, and 640 may provide the deepest at a position overlapping the center of the light emitting device 300 and the depth gradually decreases as the distance from the center of the light emitting device 300 increases, and may be provided with a gradually smaller width as the distance from the overlapping position with the center of the light emitting device 300 increases. Accordingly, in a region adjacent to the light emitting device 300, the area and depth of the concave portion 61 of the first pattern portion 610 is the largest, and the area and depth may be reduced as the concave portion is farther from the light emitting device 300, so that patterns capable of diffusing light in proportion to the light intensity may be disposed.

Here, Table 1 shows examples in which a structure (comparative example) without an optical pattern and the luminance of a module having an optical pattern portion as in Examples 1 to 3 of the invention were compared and tested.

TABLE 1

| Luminance (Nit) | Comparative example | Example 1 | Example 2 | Example 3 |
|---|---|---|---|---|
| Minimum | 4330 | 4792 | 4898 | 4949 |
| Maximum | 77495 | 87234 | 90144 | 101909 |
| Intermediate | 15141 | 20458 | 20599 | 20564 |

As in the above experimental examples, since the maximum value of the luminance of the comparative example without the optical pattern is the lowest and the intermediate value of the luminance is also the lowest, the incident light is totally reflected and proceeds into the resin layer. Since the maximum and intermediate values of the luminance of the first example are increased, it may be seen that the amount of total reflection by the optical pattern portion is reduced, and the light extraction efficiency is improved. In the luminance of the second example, the maximum value may be increased, and the amount of light emitted from the entire region may be increased. In the luminance of the third example, the maximum value may be increased, and the amount of light emitted from the entire region may be increased. Accordingly, even if a separate light blocking member is not disposed on the resin layer having the optical pattern portion, the uniformity of light may be improved and the amount of transmitted light refracted on the optical pattern portion may be increased.

Figure 18:
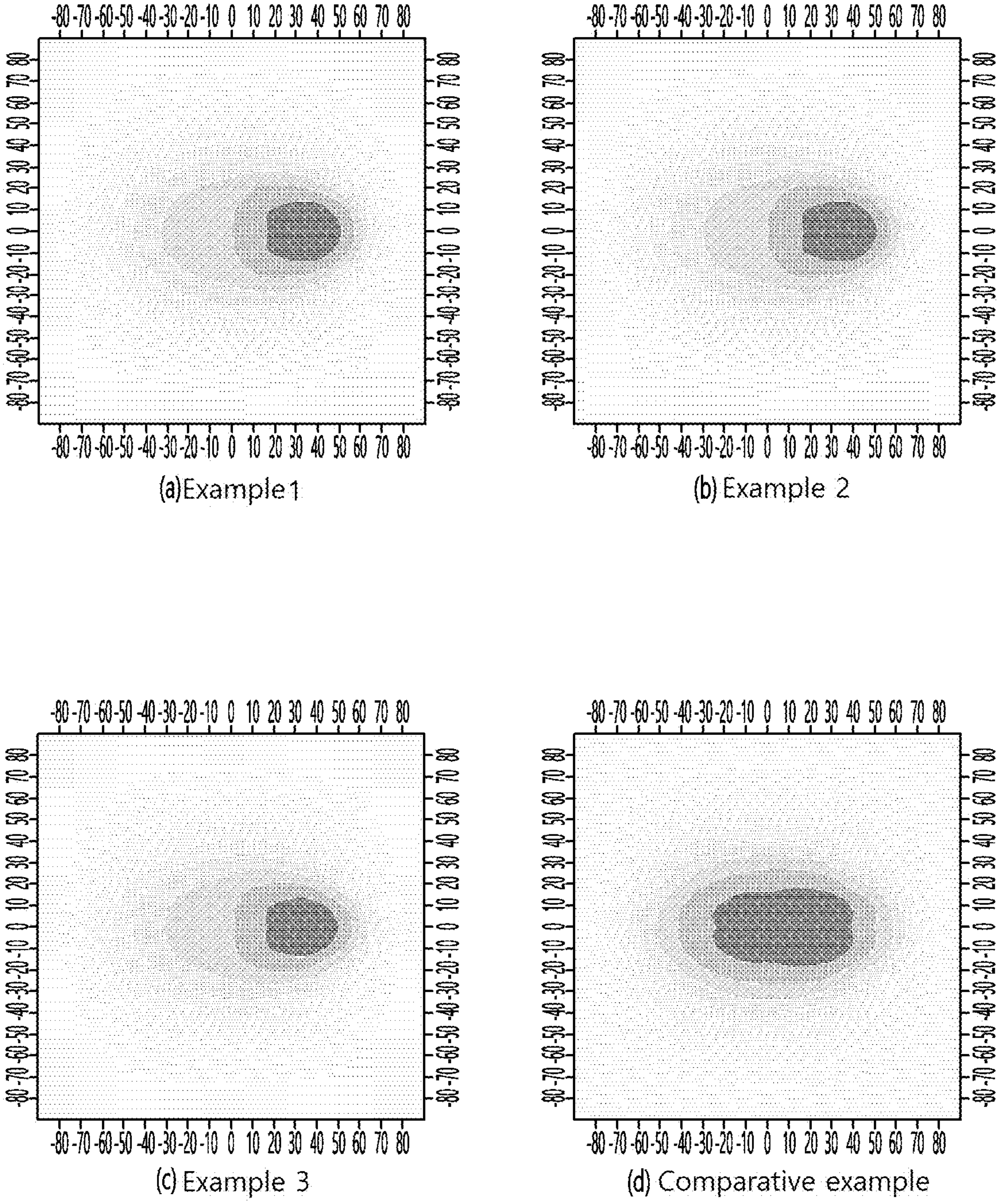
FIGS. 18 (*a*) to (*d*) are light distribution in examples 1, 2, and 3 of the optical pattern portion according to an embodiment of the invention, and a view showing the light distribution of the comparative example.

FIG. 18(*a*)(*b*)(*c*) shows the directivity distribution of light in Examples 1 to 3, and (*d*) is a view showing the directivity distribution of light in comparative example without an optical pattern. Here, the flux distribution is measured at an angle of 35 degrees with respect to the horizontal direction passing through the center of the light emitting device. In the flux distribution, it may be seen that FIG. 18 (*a*)(*b*)(*c*) is detected at 24 cd or more, and (*d*) is about 20.5 cd, which is lower than the examples of the invention.

Figure 19:
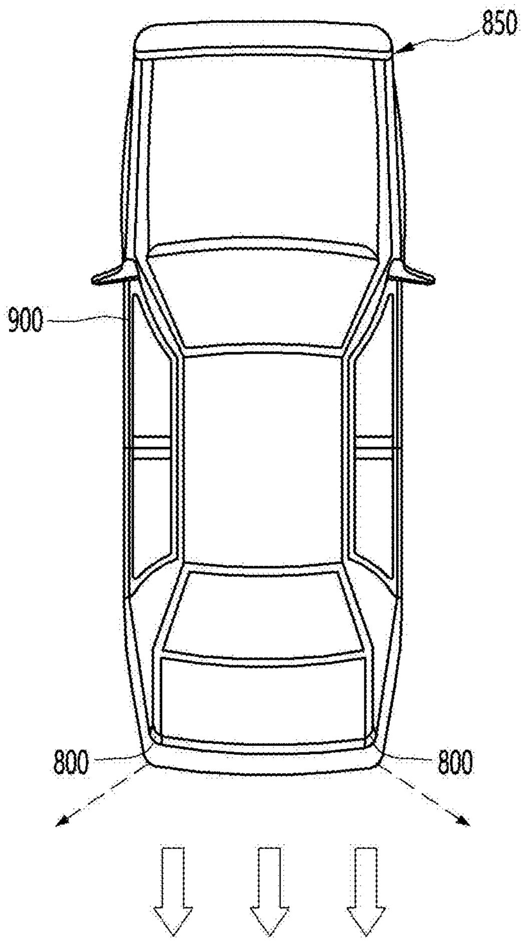
FIG. 19 is a view showing an example of a plan view of a vehicle having the lighting device of the invention.
Figure 20:
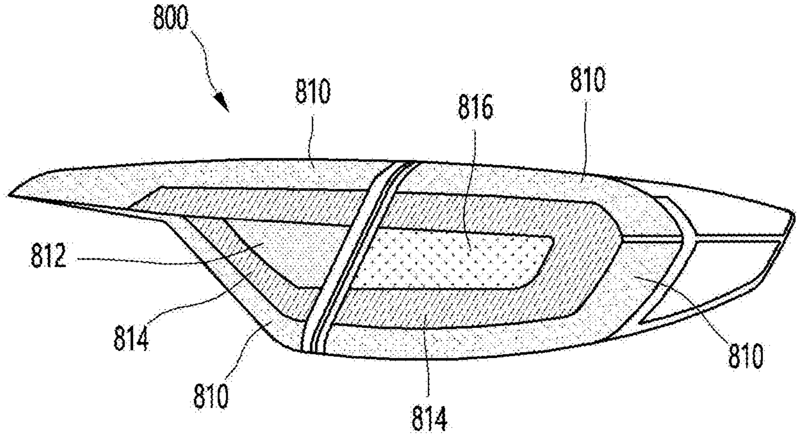
FIG. 20 is an example of a tail lamp of a vehicle to which the lighting device of FIG. 19 is applied.

FIG. 19 is a plan view of a vehicle to which the lighting device according to an embodiment of the invention is applied, and FIG. 20 is a view showing an example of a tail lamp of the vehicle of FIG. 19.

Referring to FIGS. 19 and 20, a front lamp 850 in the moving object or vehicle 900 may include one or more lighting modules, and control the driving timing of these lighting modules individually to function as a typical headlamp as well as, when the driver opens the vehicle door, additional functions such as a welcome light or a celebration effect can be provided. The lamp may be applied to a daytime running lamp, a high beam, a low beam, a fog lamp or a turn signal lamp. In the vehicle 900, the tail lamp 800 may be arranged with a plurality of lamp units 810, 812, 814, and 816 supported by the housing 801. For example, the lamp units 810, 812, 814, and 816 may include a first lamp unit 810 disposed outside, a second lamp unit 814 disposed around the inner circumference of the first lamp unit 810, and third and fourth lamp units 814 and 816 respectively disposed on the inside the second lamp unit 814. The first to fourth lamp units 810, 812, 814, and 816 may selectively apply the lighting device disclosed in the embodiment, and a red lens cover or a white lens cover for the lighting characteristics of the lamp units 810, 812, 814, and 816 on the outside of the lighting device may be placed. The lighting device disclosed in the embodiment applied to the lamp units 810, 812, 814, and 816 may emit surface light in a uniform distribution. The first and second lamp units 810 and 812 may be provided in at least one of a curved shape, a straight shape, an angled shape, an inclined shape, and a flat shape, or a mixed structure thereof. One or a plurality of the first and second lamp units 810 and 812 may be disposed in each tail lamp. The first lamp unit 810 may be provided as a tail lamp, the second lamp unit 812 may be provided as a brake lamp, and the third lamp unit 814 may be provided as a reverse lamp, and the fourth lamp unit 816 may be provided as a turn signal lamp. The structure and position of these lighting lamps can be changed. Such a lighting lamp may provide a higher luminous intensity in a rear direction than in a lateral direction, and thus may comply with light distribution regulations such as a stop lamp or a tail lamp.

Features, structures, effects, etc. described in the above embodiments are included in at least one embodiment of the invention, and are not necessarily limited to only one embodiment. Furthermore, features, structures, effects, etc. illustrated in each embodiment can be combined or modified for other embodiments by those of ordinary skill in the art to which the embodiments belong. Accordingly, the contents related to such combinations and modifications should be interpreted as being included in the scope of the invention. In addition, although the embodiment has been described above, it is merely an example and does not limit the invention, and those of ordinary skill in the art to which the invention pertains are exemplified above in a range that does not depart from the essential characteristics of the present embodiment. It can be seen that various modifications and applications that have not been made are possible. For example, each component specifically shown in the embodiment can be implemented by modification. And differences related to such modifications and applications should be construed as being included in the scope of the invention defined in the appended claims.

Technical Problem

An embodiment of the invention may provide a lighting module and a lighting device having a light source sealed in a resin layer and an optical pattern portion on a surface of the resin layer. An embodiment of the invention may provide a lighting module and a lighting device having a light source sealed in a resin layer and an optical pattern portion in which concave portions recessed from a surface of the resin layer toward the substrate are arranged.

An embodiment of the invention may provide a lighting module and a lighting device in which concave portions are disposed from an upper periphery of each of the light sources toward a lower surface of the resin layer.

Technical Solution

A lighting device according to an embodiment of the invention includes: a substrate; a reflective member disposed on the substrate; a plurality of light emitting devices disposed on the substrate; a resin layer disposed on the reflective member; and an optical pattern portion having a plurality of concave portions formed concavely on an upper surface of the resin layer, wherein the plurality of light emitting devices are spaced apart from each other in a first direction in which light is emitted, and the optical pattern portion may include a pattern portion in which a width of the concave portions in the first direction at a position overlapping a center of each of the plurality of light emitting devices is reduced, and the optical pattern portion may include a pattern portion in which a width of the concave portions toward both sides of a second direction at the center of the optical pattern portion is reduced.

According to an embodiment of the invention, the pattern portion of the optical pattern portion may include two or more pattern portions, and each of the two or more pattern portions may have a plurality of concave portions arranged the first and second directions. Each of the two or more pattern portions may include a convex portion between the plurality of concave portions. A width of the concave portion in a first pattern portion adjacent to each of the light emitting devices among the two or more pattern portions may be greater than a width of the convex portion.

A width of the concave portion of a second pattern portion most spaced apart from the center of the light emitting device may be equal to or smaller than a width of the convex portion. According to an embodiment of the invention, the plurality of concave portions disposed in the optical pattern portion may have the same depth. The plurality of concave portions disposed in the optical pattern portion have different depths, and a depth of concave portions of the first pattern portion disposed on the upper portion of the light emitting device may be the largest among the concave portions, and a depth of concave portions of the second pattern portion disposed outside the optical pattern portion may be the smallest among the concave portions. The concave portions may have a polygonal columnar shape or a columnar shape having a curved surface at a lower portion. A maximum length of the optical pattern portion in the first direction may be smaller than a maximum length of the second direction. The optical pattern portion may be disposed on each of the light emitting devices, and an area of the optical pattern portion may be in a range of 6 to 18 times the area of the light emitting device. The width of each of the concave portions may be in a range of 0.25 mm to 0.5 mm. The depth of the concave portions may be in a range of 0.25 mm to 0.65 mm. A taillight according to an embodiment of the invention is flexible and may include the lighting device.

Advantageous Effects

According to an embodiment of the invention, the light distribution characteristic of the vehicle lighting device may be improved. Since the light reflected by the optical pattern portion on the surface of the resin layer is reduced in the lighting device, light distribution efficiency may be increased. The lighting device refracts the light by the optical pattern portion on the surface of the resin layer, so that an amount of emitted light may be increased. The lighting device may provide directionality for the distribution of light. The lighting device may provide a thinner thickness of the lighting module by disposing the optical pattern portion on the resin layer. The lighting device may improve the reliability of lighting having an optical pattern portion.

Any reference in this specification to “one embodiment,” “an embodiment,” “example embodiment,” etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A lighting device comprising:

a substrate;

a reflective member disposed on the substrate;

a light emitting device disposed on the substrate;

a resin layer disposed on the reflective member and sealing the light emitting device; and a plurality of optical pattern portions having a plurality of concave portions on an upper surface of the resin layer and a convex portion disposed between the plurality of concave portions, wherein the light emitting device emits light toward a first direction of the resin layer, wherein the optical pattern portion includes a plurality of pattern portions in which the concave portions are arranged on both sides in the first direction and a second direction orthogonal to the first direction at a region overlapping the light emitting device, wherein the plurality of concave portions is disposed on both sides in the first direction and on both sides in the second direction based on the convex portion, wherein the optical pattern portion includes an intermediate convex portion arranged between the plurality of pattern portions, wherein a width of an upper surface of the intermediate convex portion in the first direction is larger than a width of an upper surface of the convex portion of the optical pattern portion in the first direction, and wherein each of the concave portions has a blank region, and incident light is refracted and emitted.

2. The lighting device of claim 1, wherein the light emitting device is disposed in the first direction in plurality, and wherein the optical pattern portion is disposed in the first direction in plurality.

3. The lighting device of claim 2, wherein each of the plurality of optical pattern portions includes a pattern portion in which a width of the concave portions arranged in the first direction is reduced at a position overlapping a center of each of the plurality of light emitting devices, and wherein each of the plurality of optical pattern portions includes a pattern portion in which a width of the concave portions arranged on both sides in the second direction orthogonal to the first direction from the center of each of the plurality of optical pattern portions is reduced.

4. The lighting device of claim 3, wherein an interval between the plurality of optical pattern portions is smaller than an interval between the plurality of light emitting devices, and wherein each of the plurality of optical pattern portions has a maximum length in the first direction smaller than a maximum length in the second direction.

5. The lighting device of claim 1, wherein a depth of the concave portions arranged in the first direction is smaller than the width of the upper surface of the convex portion in the first direction.

6. The lighting device of claim 1, wherein the width of the upper surface of the middle convex portion in the first direction is greater than the width of the upper surface of the convex portion in the first direction, and wherein the width of the upper surface of the middle convex portion in the first direction is 0.4 mm or more.

7. The lighting device of claim 2, wherein a width of a concave portion of a first pattern portion adjacent to each of the light emitting devices among the pattern portions is greater than the width of the convex portion.

8. The lighting device of claim 2, wherein the width of a concave portion of a second pattern portion, which is furthest from a center of each of the light emitting devices among the pattern portions, is equal to or smaller than the width of the convex portion.

9. The lighting device of claim 1, wherein the plurality of concave portions arranged in the optical pattern portion have the same depth.

10. The lighting device of claim 1, wherein the plurality of concave portions arranged in the optical pattern portion have different depths.

11. The lighting device of claim 10, wherein the pattern portions include a first pattern portion adjacent to the light emitting device, wherein concave portions of the first pattern portion have the deepest depth among the depths of the concave portions in the optical pattern portion.

12. The lighting device of claim 11, wherein the width of the concave portion of the first pattern portion is greater than the width of the convex portion.

13. The lighting device of claim 10, wherein the pattern portions include a second pattern portion arranged on an outer side of the optical pattern portion, wherein concave portions of the second pattern portion are the smallest depth among the depths of the concave portions in the optical pattern portion.

14. The lighting device of claim 1, wherein each of the concave portions has a shape of a polygonal column or a column having a curved surface at a lower portion.

15. The lighting device of claim 1, wherein a depth of the concave portion is in a range of 0.25 mm to 0.8 mm.

16. The lighting device of claim 2, wherein each of the plurality of optical pattern portions is spaced apart from an outer side or edge of the resin layer, wherein the upper surfaces of the intermediate convex portion in the first and second directions have the same width.

17. The lighting device of claim 2, wherein each of the plurality of optical pattern portions is disposed on an upper surface of each of the plurality of light emitting devices, wherein an area of each of the optical pattern portions is in a range of 6 to 18 times an area of an upper surface of each of the light emitting devices.

18. The lighting device of claim 1, wherein convex portions arranged between the concave portions of the optical pattern portions are connected to each other within the pattern portion.

19. The lighting device of claim 2, wherein an interval between adjacent concave portions in the first and second directions becomes wider as it gets farther away from an emission surface of each of the light emitting device.

20. The lighting device of claim 1, wherein the width of the upper surface of the concave portion is 0.25 mm or more.

* * * * *